US012712986B2

(12) United States Patent
Chou et al.

(10) Patent No.: US 12,712,986 B2
(45) Date of Patent: Aug. 18, 2026

(54) CALL INTERACTION METHOD AND APPARATUS, COMPUTER DEVICE, AND STORAGE MEDIUM

(71) Applicant: TENCENT TECHNOLOGY (SHENZHEN) COMPANY LIMITED, Shenzhen (CN)

(72) Inventors: Shu-Hui Chou, Shenzhen (TW); Shengxi Cai, Shenzhen (CN); Xianyang Xu, Shenzhen (CN); Chunxia Hao, Shenzhen (CN); Guoxiong Lin, Shenzhen (CN); Zurong Xiong, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 206 days.

(21) Appl. No.: 18/602,568

(22) Filed: Mar. 12, 2024

(65) Prior Publication Data

US 2024/0223730 A1 Jul. 4, 2024

Related U.S. Application Data

(63) Continuation of application No. PCT/CN2023/088063, filed on Apr. 13, 2023.

(30) Foreign Application Priority Data

May 31, 2022 (CN) ......................... 202210610895.5

(51) Int. Cl.

| | |
|---|---|
| ***H04N 7/15*** | (2006.01) |
| ***G06T 13/40*** | (2011.01) |
| ***G06T 17/00*** | (2006.01) |

(52) U.S. Cl.

CPC ............. *H04N 7/157* (2013.01); *G06T 13/40* (2013.01); *G06T 17/00* (2013.01); *H04N 7/152* (2013.01)

(58) Field of Classification Search

CPC ........ H04N 7/157; H04N 7/152; G06T 13/40; G06T 17/00

(Continued)

(56) References Cited

U.S. PATENT DOCUMENTS 10,835,827 B1 11/2020 Pather et al.
11,477,507 B2 * 10/2022 Kawakami ......... H04N 21/8146

(Continued)

FOREIGN PATENT DOCUMENTS

CN 101690150 A 3/2010
CN 106162369 A 11/2016

(Continued)

OTHER PUBLICATIONS

China National Intellectual Property Administration (CNIPA) Office Action 1 for Application No. 202210610895.5, Jun. 27, 2025 8 Pages (including translation).

(Continued)

*Primary Examiner* — Binh Kien Tieu
(74) *Attorney, Agent, or Firm* — Anova Law Group, PLLC

(57) ABSTRACT

Embodiments of this application provide a call interaction method and apparatus, a computer device, a storage medium, and a computer program product. The method includes displaying virtual space and maintaining a call between at least two call parties in response to a virtual space entry event; displaying one or more virtual avatars with a virtual avatar corresponding to at least one of the call parties in the virtual space, the displayed one or more virtual avatars comprising a virtual avatar of the call party that (Continued)

enters the virtual space based on the virtual space entry event; and triggering a virtual avatar among the one or more virtual avatars to perform an interactive action in the virtual space in response to an interaction triggering event for the virtual avatar.

19 Claims, 20 Drawing Sheets

(58) Field of Classification Search
USPC ........................................................ 348/14.09
See application file for complete search history.

(56) References Cited

U.S. PATENT DOCUMENTS

| | | | | |
|---|---|---|---|---|
| 12,260,499 | B1 * | 3/2025 | Charbonnet | G06Q 10/10 |
| 12,302,038 | B2 * | 5/2025 | Lin | H04N 7/147 |
| 2018/0095636 | A1 * | 4/2018 | Valdivia | G06F 3/011 |
| 2023/0015940 | A1 | 1/2023 | Zhang et al. | |
| 2023/0096597 | A1 * | 3/2023 | Lin | H04N 7/147 348/14.09 |
| 2023/0101879 | A1 * | 3/2023 | Lin | G06F 3/04815 715/757 |
| 2023/0283850 | A1 * | 9/2023 | Watanabe | H04N 21/4821 725/38 |
| 2023/0334559 | A1 | 10/2023 | Li | |
| 2023/0385011 | A1 * | 11/2023 | Shimizu | H04N 7/157 |

FOREIGN PATENT DOCUMENTS

| | | | |
|---|---|---|---|
| CN | 110050248 | A | 7/2019 |
| CN | 111884914 | A | 11/2020 |
| CN | 114432699 | A | 5/2022 |
| KR | 20190104821 | A | 9/2019 |
| WO | 2019095131 | A1 | 5/2019 |
| WO | 2021257868 | A1 | 12/2021 |

OTHER PUBLICATIONS

The World Intellectual Property Organization (WIPO) International Search Report for PCT/CN2023/088063 Jun. 1, 2023 6 Pages (including translation).

* cited by examiner

Figure 2A:
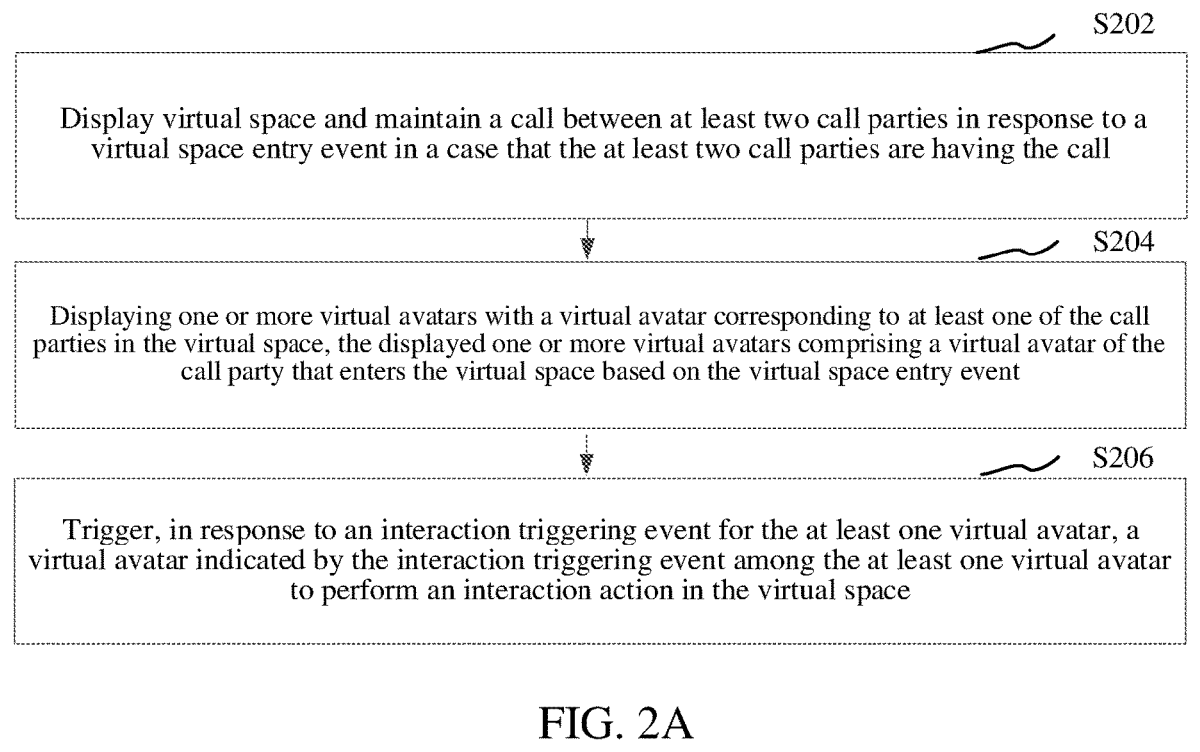

S202

Display virtual space and maintain a call between at least two call parties in response to a virtual space entry event in a case that the at least two call parties are having the call

S204

Displaying one or more virtual avatars with a virtual avatar corresponding to at least one of the call parties in the virtual space, the displayed one or more virtual avatars comprising a virtual avatar of the call party that enters the virtual space based on the virtual space entry event

S206

Trigger, in response to an interaction triggering event for the at least one virtual avatar, a virtual avatar indicated by the interaction triggering event among the at least one virtual avatar to perform an interaction action in the virtual space

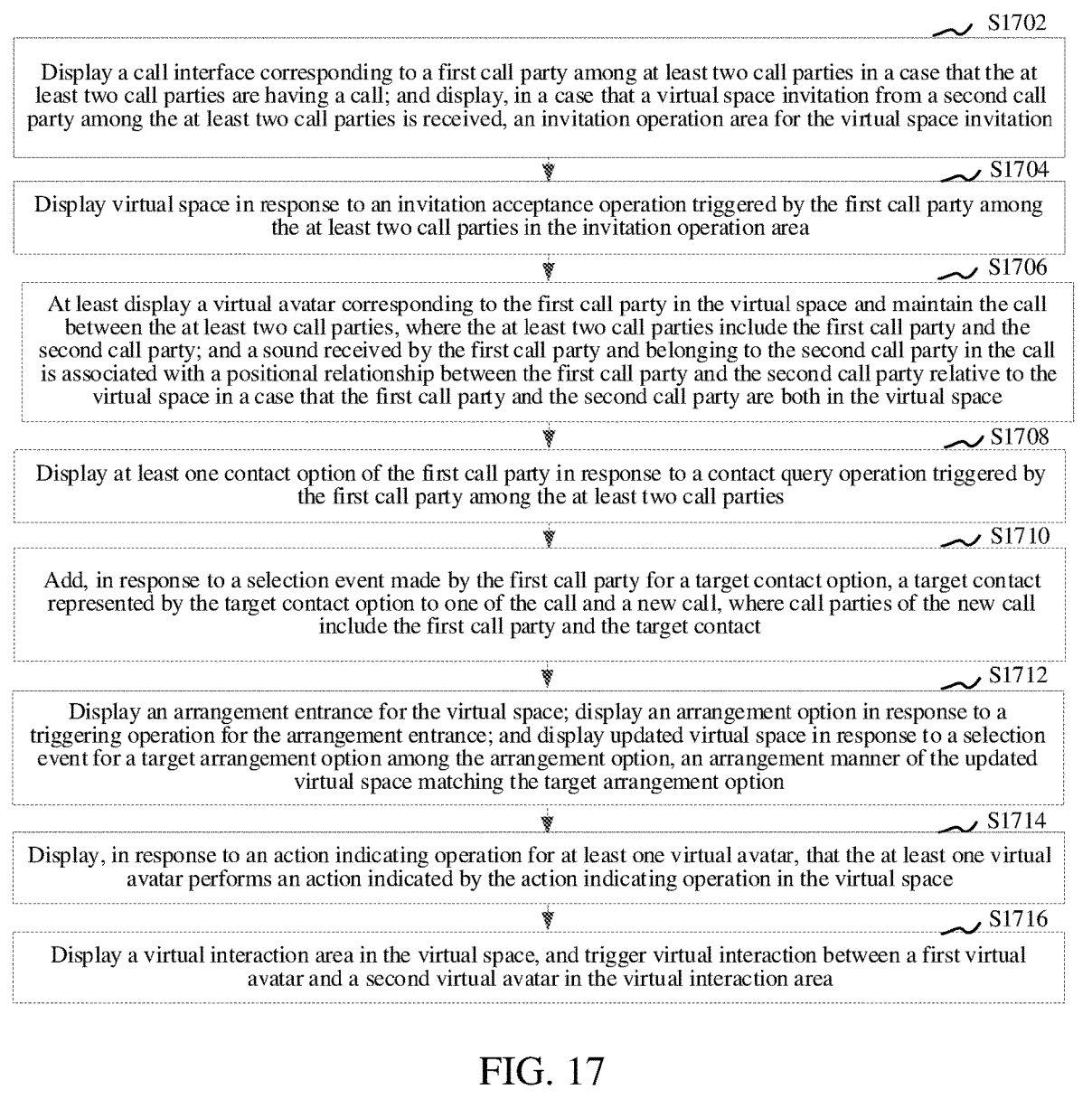

Display a call interface corresponding to a first call party among at least two call parties in a case that the at least two call parties are having a call; and display, in a case that a virtual space invitation from a second call party among the at least two call parties is received, an invitation operation area for the virtual space invitation

S1704

Display virtual space in response to an invitation acceptance operation triggered by the first call party among the at least two call parties in the invitation operation area

S1706

At least display a virtual avatar corresponding to the first call party in the virtual space and maintain the call between the at least two call parties, where the at least two call parties include the first call party and the second call party; and a sound received by the first call party and belonging to the second call party in the call is associated with a positional relationship between the first call party and the second call party relative to the virtual space in a case that the first call party and the second call party are both in the virtual space

S1708

Display at least one contact option of the first call party in response to a contact query operation triggered by the first call party among the at least two call parties

S1710

Add, in response to a selection event made by the first call party for a target contact option, a target contact represented by the target contact option to one of the call and a new call, where call parties of the new call include the first call party and the target contact

S1712

Display an arrangement entrance for the virtual space; display an arrangement option in response to a triggering operation for the arrangement entrance; and display updated virtual space in response to a selection event for a target arrangement option among the arrangement option, an arrangement manner of the updated virtual space matching the target arrangement option

S1714

Display, in response to an action indicating operation for at least one virtual avatar, that the at least one virtual avatar performs an action indicated by the action indicating operation in the virtual space

S1716

Display a virtual interaction area in the virtual space, and trigger virtual interaction between a first virtual avatar and a second virtual avatar in the virtual interaction area

FIG. 17

CALL INTERACTION METHOD AND APPARATUS, COMPUTER DEVICE, AND STORAGE MEDIUM

RELATED APPLICATIONS

This application is a continuation of PCT Application No. PCT/CN2023/088063, filed on Apr. 13, 2023, which claims priority to Chinese patent application Ser. No. 2022106108955, entitled "CALL-BASED INTERACTION METHOD AND APPARATUS, COMPUTER DEVICE, AND STORAGE MEDIUM" filed with the China National Intellectual Property Administration on May 31, 2022. The two applications are incorporated by reference in their entirety.

FIELD OF THE TECHNOLOGY

This application relates to the field of computer technologies, and in particular, to a call interaction method and apparatus, a computer device, a storage medium, and a computer program product.

BACKGROUND OF THE DISCLOSURE

Often, users may make a voice call via instant messaging applications. After the other party is connected, the two parties may have a voice conversation. This is convenient and fast. However, in a current method of having a voice conversation, both parties only use receiving and transmission functions of a device during the conversation, resulting in low resource utilization efficiency.

SUMMARY

Based on this, with regard to the above technical problem, it is necessary to provide a call interaction method and apparatus, a computer device, a computer-readable storage medium, and a computer program product that can improve resource utilization efficiency.

A call interaction method is provided, which includes displaying virtual space and maintaining a call between at least two call parties in response to a virtual space entry event; displaying one or more virtual avatars with a virtual avatar corresponding to at least one of the call parties in the virtual space, the displayed one or more virtual avatars comprising a virtual avatar of the call party that enters the virtual space based on the virtual space entry event; and triggering a virtual avatar among the one or more virtual avatars to perform an interactive action in the virtual space in response to an interaction triggering event for the virtual avatar.

A computer device is provided, which includes a memory and a processor, the memory having a computer program stored therein, and the processor, when executing the computer program, implementing the following steps: displaying virtual space and maintaining a call between at least two call parties in response to a virtual space entry event; displaying one or more virtual avatars with a virtual avatar corresponding to at least one of the call parties in the virtual space, the displayed one or more virtual avatars comprising a virtual avatar of the call party that enters the virtual space based on the virtual space entry event; and triggering a virtual avatar among the one or more virtual avatars to perform an interactive action in the virtual space in response to an interaction triggering event for the virtual avatar.

A non-transitory computer-readable storage medium is provided, which has a computer program stored thereon, the computer program, when executed by a processor, implementing the following steps: displaying virtual space and maintaining a call between at least two call parties in response to a virtual space entry event; displaying one or more virtual avatars with a virtual avatar corresponding to at least one of the call parties in the virtual space, the displayed one or more virtual avatars comprising a virtual avatar of the call party that enters the virtual space based on the virtual space entry event; and triggering a virtual avatar among the one or more virtual avatars to perform an interactive action in the virtual space in response to an interaction triggering event for the virtual avatar.

BRIEF DESCRIPTION OF THE DRAWINGS

FIG. 2A is a schematic flowchart of a call interaction method according to an embodiment.

FIG. 17 is a schematic flowchart of a call interaction method according to another embodiment.

DESCRIPTION OF EMBODIMENTS

Figure 1:
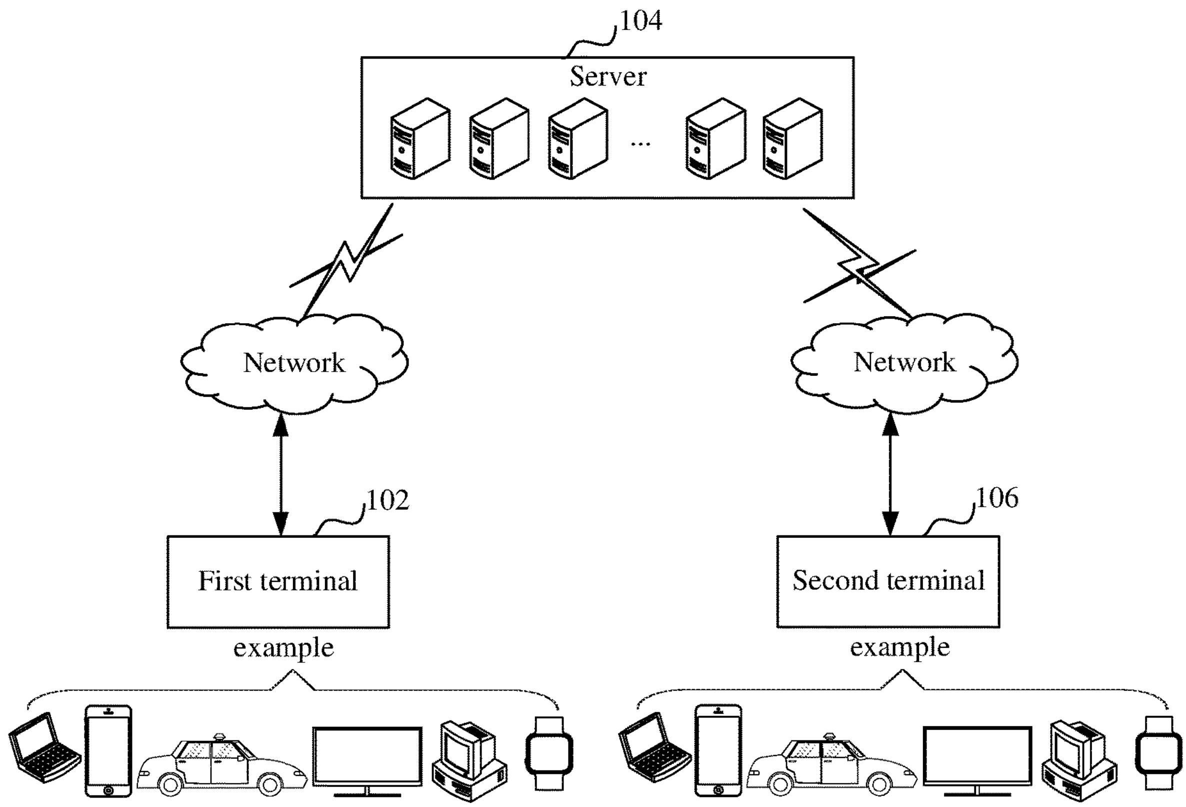
FIG. 1 is a diagram of an application environment of a call interaction method according to an embodiment.

A call-based interaction method provided in embodiments of this application may be implemented in an application environment shown in FIG. 1. A first terminal 102 communicates with a server 104 via a network, and a second terminal 106 communicates with the server 104 via a network. A data storage system may store data that server 104 needs to process. The data storage system may be integrated into server 104, or put on a cloud or another server. When a first call party has a voice call with a second call party via the first terminal 102, the first call party may trigger the first terminal 102 to display virtual space and display a virtual avatar of the first call party in the virtual space. When it is necessary to invite the second call party to enter the virtual space, the first terminal 102 may generate an invitation request and send the invitation request to the second terminal 106 via server 104. The second call party may respond to the invitation request via the second terminal 106 to enter the virtual space. In this case, the first call party and the second call party may maintain the call. Both the first terminal 102 and the second terminal 106 may display the virtual space and display virtual avatars of the first call party and the second call party respectively in the virtual space.

The terminal 102 may be, but is not limited to, various desktop computers, laptop computers, smart phones, tablets computers, Internet of Things devices, and portable wearable devices. The Internet of Things devices may be smart speakers, smart TVs, smart air conditioners, smart on-board devices, and the like. The portable wearable devices may be smartwatches, smart bands, head-mounted devices, and the like. The server 104 may be implemented by using an independent server or a server cluster that includes a plurality of servers.

In one embodiment, as shown in FIG. 2A, a call interaction method is provided. A description is provided by using an example in which the method is implemented on a terminal. The terminal may be specifically the first terminal or the second terminal in FIG. 1. Call interaction includes the following steps:

Step 202. Display virtual space and maintain a call between at least two call parties in response to a virtual space entry event in a case that the at least two call parties are having the call.

In some embodiments, an instant messaging application may be run in the first terminal corresponding to a first call party, and an instant messaging application may also be run in the second terminal corresponding to the second call party. The first call party may have a call with the second call party via the instant messaging applications. When the first terminal detects that the first call party is having the call with the second call party, the first terminal may display the virtual space in response to the virtual space entry event, and maintain the call between the first call party and the second call party both while the virtual space is displayed and after the virtual space is displayed. The virtual space entry event is an event for entering the virtual space. For example, a virtual space entrance control may be displayed on a call interface, and an event that a call party taps the virtual space entrance control may be referred to as the virtual space entry event. For another example, a gesture for quickly entering virtual space may be preset. When a call party triggers the gesture for quickly entering virtual space in a call interface, an event that the call party triggers the gesture for quickly entering the virtual space in the call interface may be referred to as the virtual space entry event. The virtual space is the display space in a virtual scene, and may also be referred to as a virtual room. The first call party is a call party on a local terminal side, that is, an object that uses a local terminal to have the call. The second call party is a call party on an opposite side, that is, an object that uses another terminal to have the call. It is easy to understand that there may be one or more second call parties. When there is only one second call party, the call in this case is a two-person call. When there are two or more second call parties, the call in this case is a multi-person call.

In one embodiment, the call may be a voice call or a video call.

In one embodiment, when the second terminal detects that the first call party is having the call with the second call party, the second terminal may also display virtual space. In this case, the virtual space displayed by the first terminal may be the same as the virtual space displayed by the second terminal.

In one embodiment, when the first call party has the call with the second call party via the instant messaging application, the instant messaging may display a prompt interface for the ongoing call. When the first call party enters the virtual space, the prompt interface for the ongoing call may be changed to a virtual scene display page, and the virtual space is displayed in the virtual scene display page.

Step 204. Display a virtual avatar corresponding to at least one of the call parties in the virtual space, the displayed virtual avatar including a virtual avatar of the call party that enters the virtual space based on the virtual space entry event.

In one embodiment, when the first terminal displays the virtual space, the first terminal may display the virtual avatar corresponding to the at least one of the call parties in the virtual space. Because the call party may enter the virtual space based on the virtual space entry event, the first terminal may display in the virtual space the virtual avatar of the call party that enters the virtual space based on the virtual space entry event. It is easy to understand that when the first call party triggers the virtual space entry event, for example, when the first call party taps the virtual space entrance control, the first terminal may display a virtual avatar of the first call party in the virtual space. When the second call party also triggers the virtual space entry event, for example, when the second call party also taps the virtual space entrance control, the first terminal may also display a virtual avatar of the second call party in the virtual space. The virtual space entrance control may be tapped once to trigger all the call parties to enter the virtual space, so that the first terminal displays the virtual avatar corresponding to each call party.

In one embodiment, the displaying virtual space and maintaining a call between at least two call parties in a case that the at least two call parties are having the call includes: displaying the virtual space and maintaining the call between the at least two call parties in response to the virtual space entry event triggered by the first call party among the at least two call parties in a case that the at least two call parties are having the call; the displaying a virtual avatar corresponding to at least one of the call parties in the virtual space includes: displaying the virtual avatar corresponding to the first call party in the virtual space.

Specifically, in a case that at least two call parties are having the call, the first call party may determine according to its own requirements whether to enter the virtual space. When the first call party determines to enter the virtual space, the first terminal may display the virtual space in response to the triggered virtual space entry event, and maintain the voice call with the second call party during a process of displaying the virtual space. When the first terminal displays the virtual space, the first terminal may at least display the virtual avatar corresponding to the first call party in the virtual space.

It is easy to understand that the second call party may also trigger the virtual space entry event, so that the second terminal displays the virtual space in response to the virtual space entry event triggered by the second call party. The virtual space displayed by the first terminal in response to the virtual space entry event triggered by the first call party may be different from the virtual space displayed by the second terminal in response to the virtual space entry event triggered by the second call party. For example, when the first call party taps a virtual space entrance control in the first terminal, the first terminal may display the virtual space of the first call party. When the second call party taps the virtual space entrance control in the second terminal, the second terminal may display the virtual space of the second call party.

In one embodiment, when the virtual space is displayed, the first terminal may obtain avatar data related to the virtual avatar, and draw the virtual avatar based on the obtained avatar data.

In one embodiment, when the first terminal displays the virtual space corresponding to the first call party, the first terminal may display the virtual avatar corresponding to the first call party in the virtual space. Alternatively, the first terminal may display the virtual avatar corresponding to the first call party and the virtual avatar corresponding to the second call party in the virtual space corresponding to the first call party.

In this embodiment, by displaying the virtual avatar in the virtual space, compared with display of only a prompt interface for an ongoing call, or only a partial image captured by a camera, embodiments of this application may enrich content displayed by the terminal, thereby providing an avatar's sense of space.

Step 206. Trigger, in response to an interaction triggering event for the at least one virtual avatar, a virtual avatar indicated by the interaction triggering event among the at least one virtual avatar to perform an interactive action in the virtual space.

The interaction triggering event is an event for instructing the virtual avatar to perform the interactive action. For example, the interaction triggering event may be specifically an event that the call party triggers an action indicating operation. The action indicating operation is an operation for controlling a virtual object in the virtual space to perform the interactive action. For example, when the virtual object is a virtual avatar corresponding to a call party, an action control instruction may be specifically, for example, an operation for instructing the virtual avatar to squat, applaud, and walk. An action control operation may be triggered by using an action controlling control displayed in the virtual space. For example, a squat control for controlling squatting of the virtual avatar may be displayed in the virtual space. When the call party taps the squat control, it can be considered that the call party triggers a squat control operation, so an event that the call party triggers the squat control operation is referred to as the interaction triggering event.

The interactive action is an action performed by the virtual object that is triggered in response to the interaction triggering event. For example, in the above example, when the interaction triggering event is an event that the call party triggers a squat indicating operation, the terminal may control the virtual avatar to squat in response to the interaction triggering event. "The virtual avatar squats" is an interactive action indicated by "the event of triggering a squat indicating operation", that is, the interactive action indicated by the interaction triggering event. For another example, in the above example, when the interaction triggering event is an event that the call party triggers a move indicating operation, the terminal may control a virtual object to move in response to the interaction triggering event. "The virtual object moves" is an interactive action indicated by "the event of triggering a move indicating operation", that is, the interactive action indicated by the interaction triggering event.

The call party may instruct all or some of virtual avatars in the virtual scene to perform the interactive action. In this case, a virtual avatar indicated by the call party is referred to as the virtual avatar indicated by the interaction triggering event. For example, when the interaction triggering event is that the call party triggers the squat indicating operation for a virtual avatar A, the virtual avatar indicated by the interaction triggering event is the virtual avatar A.

Specifically, when the first terminal displays the virtual avatar via the virtual space, the first call party may trigger the interaction triggering event for the virtual avatar displayed in the virtual space, so that the first terminal controls, in response to the interaction triggering event, the virtual avatar in the virtual space to perform the interactive action indicated by the interaction triggering event. For example, when the first call party enters the virtual space, the virtual avatar of the first call party may be displayed in the virtual space. When the first call party triggers the virtual avatar corresponding to the first call party itself to perform a squatting action, a walking action, or a jumping action, the first terminal may display a squatting animation, a walking animation, or a jumping animation in the virtual space.

In one embodiment, when the virtual avatar of the first call party and the virtual avatar of the second call party are displayed in the virtual space displayed by the first terminal, the first call party may not only control the virtual avatar corresponding to the first call party itself to perform a corresponding interactive action, but also control the virtual avatar corresponding to the second call party to perform a corresponding interactive action. Alternatively, the first call party may control the virtual avatar corresponding to the first call party itself to interact with the virtual avatar corresponding to the second call party. For example, the first call party may control the virtual avatar corresponding to the first call party itself to shake hands with, chat with, or hug the virtual avatar corresponding to the second call party.

Figure 2B:
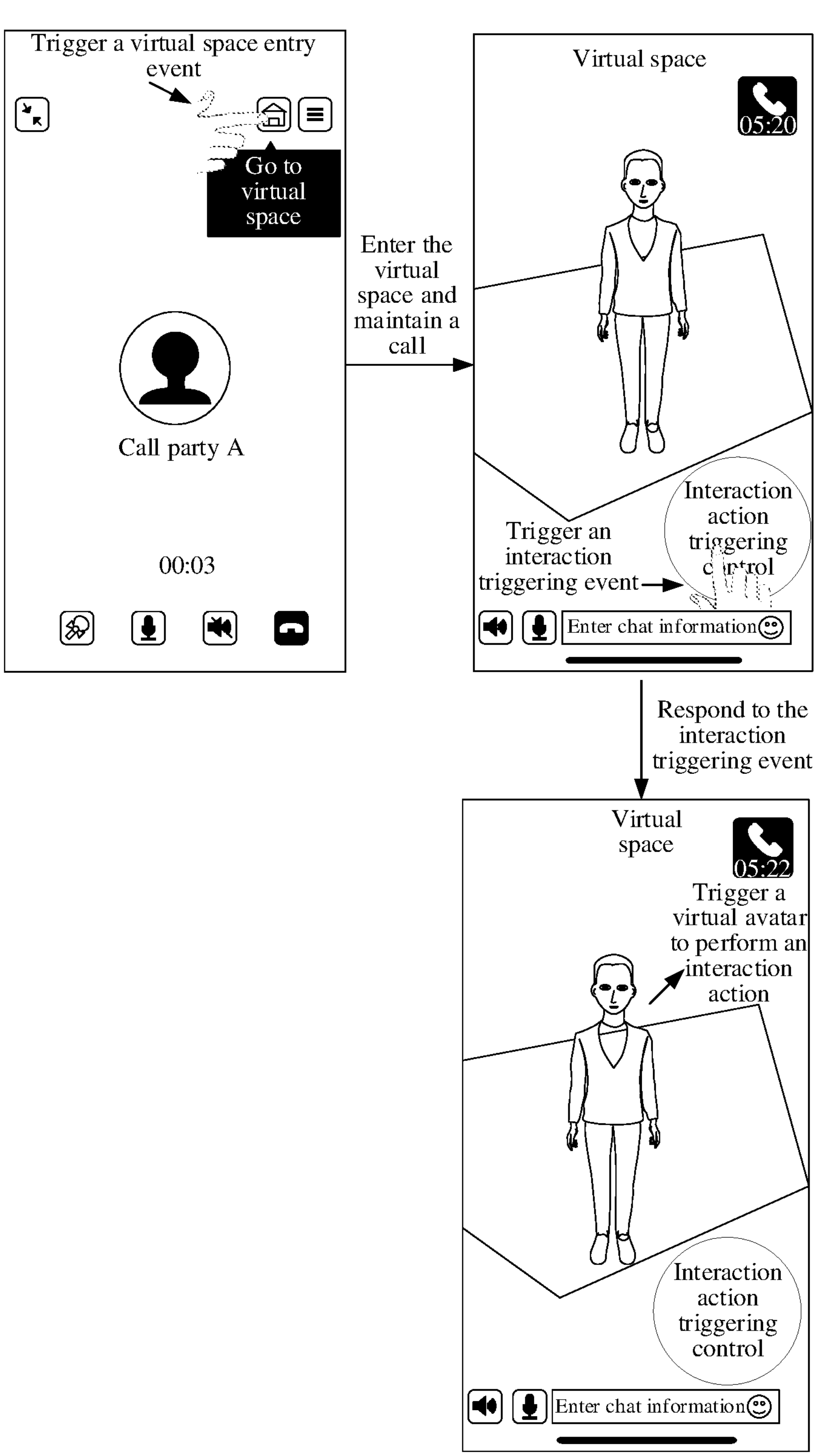
FIG. 2B is a schematic diagram of a call interaction architecture according to an embodiment.

In one embodiment, Refer to FIG. 2B. When the first call party and the second call party are having the call, the virtual space entrance control may be displayed in the call interface. Therefore, when the first call party taps the virtual space entrance control, the first terminal may trigger, in response to the virtual space entry event, the first call party and/or the second call party to enter the virtual space, display the virtual space, and maintain the call between the first call party and the second call party (corresponding to step 202). The first terminal may display the virtual avatar of the first call party and/or the second call party in the virtual space (corresponding to step 204). When the first call party taps an interaction control in the virtual space, the first terminal may consider an event that the first call party taps the interaction control in the virtual space as an interaction triggering event. Therefore, the first terminal may trigger, in response to the interaction triggering event for the virtual avatar, the virtual avatar indicated by the interaction triggering event to perform the interactive action (corresponding to step 206). FIG. 2B is a schematic diagram of showing an overall process interface of a call interaction method according to an embodiment.

In the above call interaction method, by displaying the virtual space in a case that the at least two call parties are having the call, the virtual avatar corresponding to the at least one of the call parties is displayed in the virtual space. By displaying the virtual avatar, an interactive action related to the at least one virtual avatar may be triggered in the virtual space in response to the interaction triggering event for the displayed virtual avatar. Because the call between the at least two call parties is maintained during the display of the virtual space, the virtual space may be conveniently triggered while the at least the two call parties are having the call. Therefore, via the virtual space, interaction based on the virtual avatar corresponding to the call party may be performed. Therefore, compared with the solution of only using collection and transmission functions of a device, in this application, not only collection and transmission functions of a device are used, a function of virtual space display interaction is also used, so that there are more communication opportunities between a plurality of call parties, thereby making full use of the device of the call party and improving resource utilization efficiency.

In one embodiment, the displaying the virtual space and maintaining the call between the at least two call parties in response to the virtual space entry event triggered by the first call party among the at least two call parties in a case that the at least two call parties are having the call includes: displaying a call interface corresponding to the first call party among the at least two call parties in a case that the at least two call parties are having the call; the call interface including a virtual space entrance control; and displaying the virtual space and maintaining the call between the at least two call parties in response to a triggering event triggered by the first call party for the virtual space entrance control.

Specifically, during the call between the first call party and the second call party, the first terminal corresponding to the first call party may display a call interface and display the virtual space entrance control in the call interface. Further, when the first call party desires to enter the virtual space, the first call party may trigger the virtual space entrance control. For example, the first call party may tap the virtual space entrance control to enable the first terminal to display the virtual space.

It is easy to understand that the second terminal corresponding to the second call party may also display a corresponding call interface. The second terminal may also display the virtual space entrance control in the call interface. When the second call party taps the displayed virtual space entrance control, the second terminal may display the virtual space. The virtual space displayed by the first terminal in response to the triggering event triggered by the first call party for the virtual space entrance control is different from the virtual space displayed by the second terminal in response to the triggering event triggered by the second call party for the virtual space entrance control. For example, when the first call party taps the virtual space entrance control in the first terminal, the first terminal may display the virtual space of the first call party. When the second call party taps the virtual space entrance control in the second terminal, the second terminal may display the virtual space of the second call party.

Figure 3:
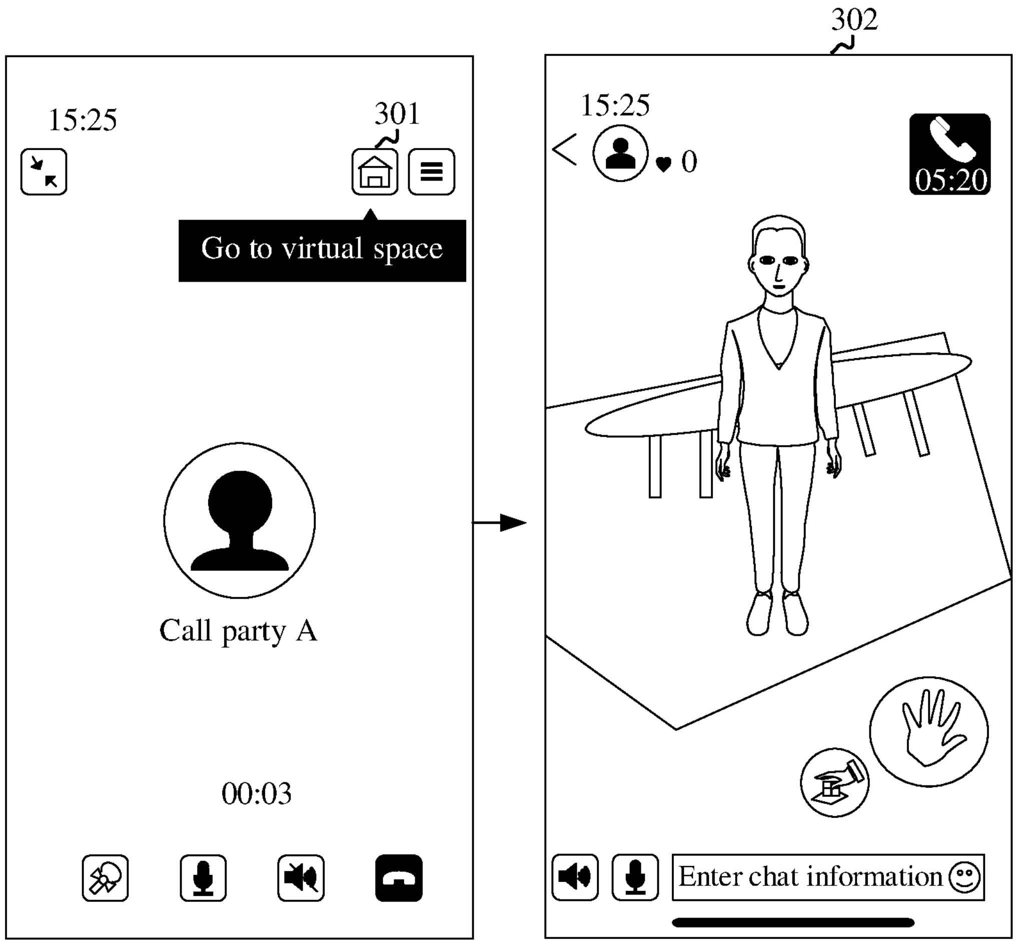
FIG. 3 is a schematic diagram of displaying virtual space according to an embodiment.

In one embodiment, Refer to FIG. 3. When the first call party and the second call party establish a communication connection, the first terminal may display the call interface as shown in FIG. 3, and display the virtual space entrance control 301 in the call interface. When it is determined that the first call party taps the virtual space entrance control 301, the first terminal may consider the tapping operation of the first call party as the triggering event for the virtual space entrance control and load the virtual space corresponding to the first call party. When loading is completed, the first terminal may display the virtual space 302. FIG. 3 is a schematic diagram of displaying virtual space according to an embodiment.

In one embodiment, when the first terminal displays, in response to a triggering operation by the first call party for the virtual space entrance control, the virtual space corresponding to the first call party, the virtual avatar corresponding to the first call party may be displayed in the virtual space.

In the above embodiment, the first call party only needs to trigger the virtual space entrance control to enter the virtual space. Accordingly, a process of entering the virtual space is greatly simplified and efficiency of entering the virtual space is improved.

In one embodiment, the displaying the virtual space in response to a triggering event triggered by the first call party for the virtual space entrance control includes: displaying the virtual space of the first call party in response to the triggering event triggered by the first call party for the virtual space entrance control; and the at least displaying the virtual avatar corresponding to the first call party in the virtual space includes: displaying the virtual avatar corresponding to the first call party and the virtual avatar corresponding to the second call party in virtual space of the first call party.

Specifically, when the first call party and the second call party are having the call, the first terminal may display, in response to the triggering event triggered by the first call party for the virtual space entrance control, the virtual space of the first call party, and display the virtual avatar corresponding to the first call party and the virtual avatar corresponding to the second call party in the virtual space of the first call party.

In this embodiment, the first terminal may not only establish a call link with the second terminal, but also display the virtual space, and display the virtual avatar corresponding to the first call party and the virtual avatar corresponding to the second call party in the virtual space. Compared with a device of a call party that may only be used for calls, in this application, the device of the call party is fully used and resource utilization efficiency is improved.

In one embodiment, the at least displaying the virtual avatar corresponding to the first call party in the virtual space includes: displaying virtual avatars respectively corresponding to the first call party and another call party in the virtual space in a case that there is the another call party that has entered the virtual space among the at least two call parties.

Specifically, when the first call party triggers the triggering event for the virtual space entrance control, the first terminal may determine whether there is the another call party that has entered the virtual space among the at least two call parties. For example, the first terminal may determine whether the second call party has entered the virtual space. In a case that the first terminal determines that there is another call party that has entered the virtual space among the at least two call parties, the first terminal displays the virtual space and displays the virtual avatars respectively corresponding to the first call party and the another call party in the virtual space. For example, the first terminal may display the virtual space entered by the second call party, and add the virtual avatar of the first call party in the virtual space entered by the second call party. In one embodiment, in a case that there is another call party that has entered the virtual space among the at least two call parties, and it is determined that the first call party triggers the triggering event for the virtual space entrance control, the first terminal may display preset virtual space, and displays the virtual avatars respectively corresponding to the first call party and the another call party in the virtual space.

The preset virtual space may be the virtual space in which the call party that has entered the virtual space is located, the virtual space of the first call party, or completely new virtual space. For example, the virtual space may be specifically a virtual room. Before the call, each call party may create its own virtual room and arrange the created virtual room. When a call party A has a call with a call party B, and the call party A has entered a virtual room A created by the call party A, a terminal corresponding to the call party B may determine whether the call party B has tapped a virtual space entrance control. If the virtual space entrance control has been tapped, the terminal corresponding to the call party B may display the virtual room A of the call party A, and add a virtual avatar of the call party B in the virtual room A. Alternatively, the terminal corresponding to the call party B may display a virtual room B created by the call party B, and display a virtual avatar of the call party A and the virtual avatar of the call party B in the virtual room B. In this case, a terminal corresponding to the call party A changes from displaying the virtual room A to displaying the virtual room B. Alternatively, the terminal corresponding to the call party B may display a new virtual room C, and display the virtual avatar of the call party A and the virtual avatar of the call party B in the new virtual room C. In this case, the terminal corresponding to the call party A changes from displaying the virtual room A to displaying the virtual room C.

Figure 4:
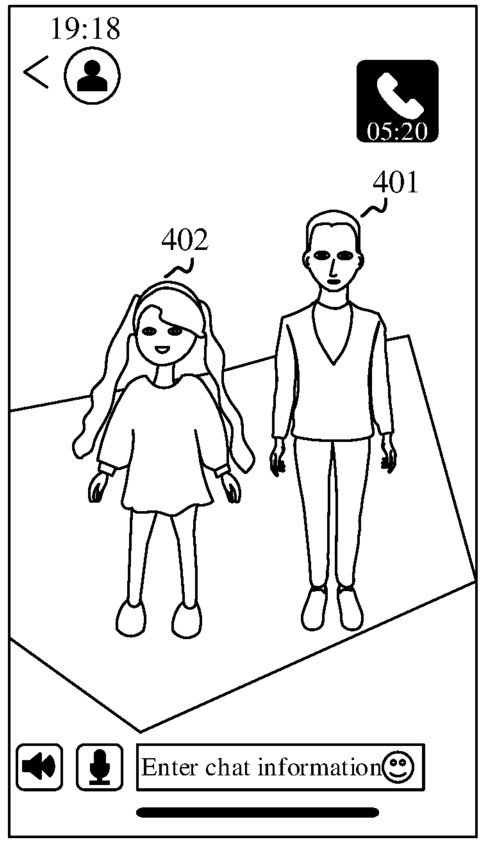
FIG. 4 is a schematic diagram of a virtual avatar according to an embodiment.

In one embodiment, Refer to FIG. 4. When there is a two-person call and the second call party has entered the virtual space, the first terminal may maintain the call between at least two call parties in response to the triggering event triggered by the first call party for the virtual space entrance control, and display that the second call party has entered the virtual space, so that the first call party enters the virtual space. The first terminal displays a virtual avatar 401 of the first call party and a virtual avatar 402 of the second call party in the displayed virtual space. FIG. 4 is a schematic diagram of a virtual avatar according to an embodiment.

Figure 5:
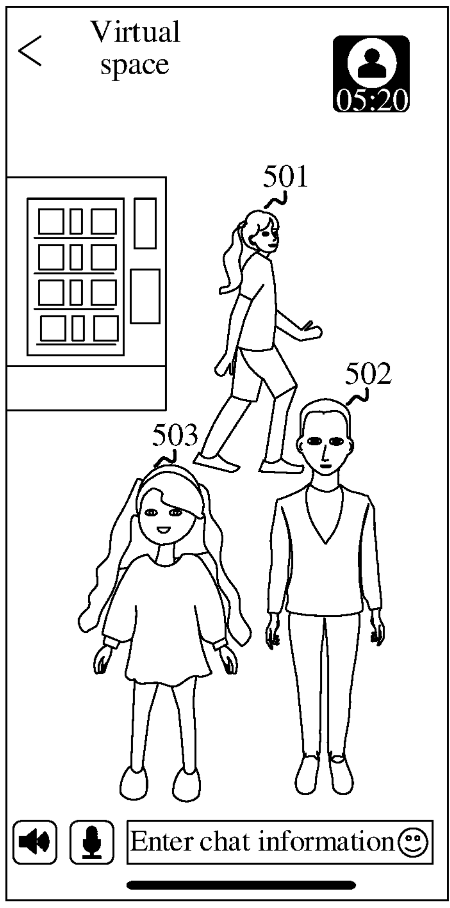
FIG. 5 is a schematic diagram of a virtual avatar according to another embodiment.

In one embodiment, Refer to FIG. 5. When there is a multi-person call and in a case that there is another call party that has entered the virtual space in the multi-person call, the first terminal may display the virtual space in response to the triggering event triggered by the first call party for the virtual space entrance control, and display the virtual avatars respectively corresponding to the first call party and the another call party in the virtual space. For example, when a call party A has entered virtual space and the first terminal determines that a call party B taps the virtual space entrance control, the first terminal may display the virtual space that the call party A has entered and display a virtual avatar 501 corresponding to the call party A, a virtual avatar 502 corresponding to the call party B, and a virtual avatar 503 corresponding to a call party C in the displayed virtual space. FIG. 5 is a schematic diagram of a virtual avatar according to another embodiment.

In the above embodiment, by displaying a virtual avatar corresponding to each call party in the virtual space, each call party may perform interaction by using the virtual avatar. This not only makes the call more interesting, but also provides more opportunities for interaction between a plurality of call parties, thereby making full use of the device of the call party and improving resource utilization efficiency.

In one embodiment, the displaying the virtual space and maintaining the call between the at least two call parties in response to the virtual space entry event triggered by the first call party among the at least two call parties in a case that the at least two call parties are having the call includes: displaying, in a case that the at least two call parties are having the call and a virtual space invitation from a second call party among the at least two call parties is received, an invitation operation area for the virtual space invitation; and displaying the virtual space and maintaining the call between the at least two call parties in response to an invitation acceptance operation triggered by the first call party among the at least two call parties in the invitation operation area.

Specifically, in a case that the at least two call parties are having the call, the second call party may invite the first call party to enter the virtual space. In a case that the first call party receives the virtual space invitation from the second call party, the first terminal may display the invitation operation area for the virtual space invitation, so that the first call party may trigger the invitation acceptance operation via the invitation operation area. When the first terminal determines that the first call party triggers the invitation acceptance operation, the first terminal may display the virtual space and maintain the call between at least two call parties.

In one embodiment, when the second call party enters the virtual space, an invitation control may be displayed in the virtual space. When the second call party taps the invitation control, the second call party may send the virtual space invitation to the first call party, so that the first call party enters virtual space based on the virtual space invitation. In this case, the virtual space entered by the first call party may be the same as the virtual space entered by the second call party, or may be different from the virtual space entered by the second call party.

In one embodiment, the displaying, in a case that the at least two call parties are having the call and a virtual space invitation from a second call party among the at least two call parties is received, an invitation operation area for the virtual space invitation includes: displaying, in a case that the at least two call parties are having the call and the virtual space invitation from the second call party that is already in the virtual space is received, the invitation operation area for the virtual space invitation, the invitation operation area displaying an acceptance control; and the displaying the virtual space in response to an invitation acceptance operation triggered by the first call party among the at least two call parties in the invitation operation area includes: displaying, in response to a triggering operation by the first call party for the acceptance control, the virtual space in which the second call party is already located.

Figure 6:
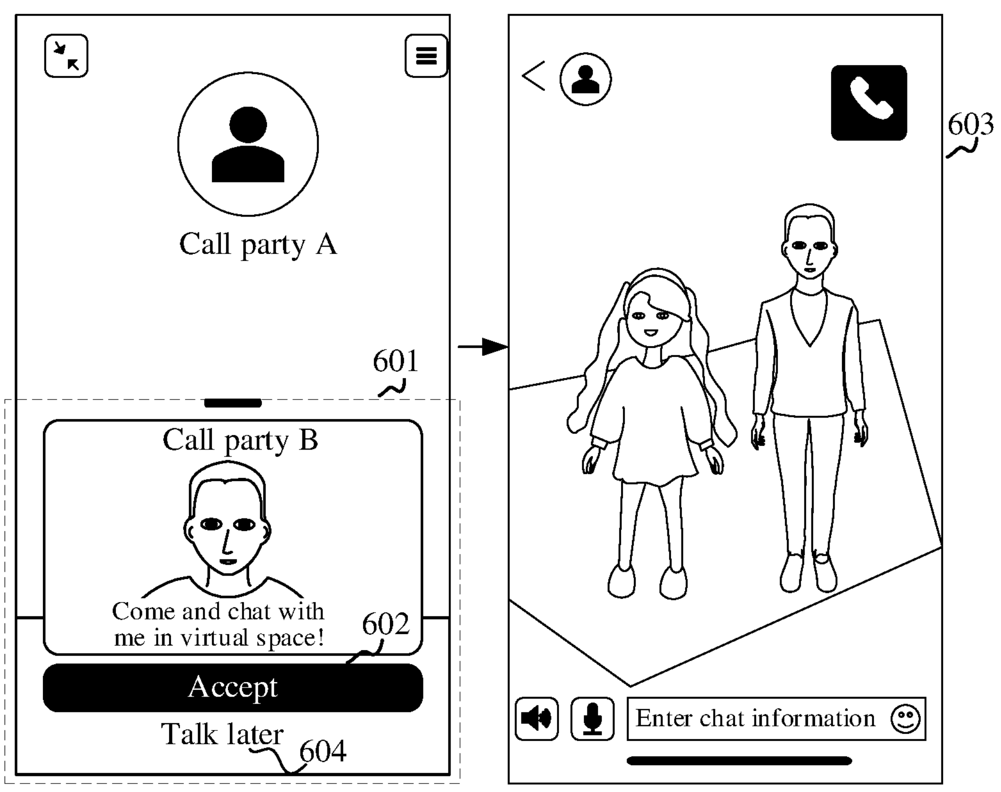
FIG. 6 is a schematic diagram of a virtual space invitation according to an embodiment.

Specifically, when the second call party enters the virtual space, the second call party may initiate the virtual space invitation to the first call party, so that when the first terminal receives the virtual space invitation, the invitation operation area for the virtual space invitation is displayed, and the acceptance control and a reject control are displayed in the invitation operation area. When the first call party triggers the acceptance control, the first terminal may display, in response to the triggering operation by the first call party for the acceptance control, the virtual space in which the second call party is located. In one embodiment, when the second call party enters the virtual space, the second call party may invite the first call party to join the call. For example, refer to FIG. 6. A call party A may invite a call party B and a call party C to join a voice call. When the first call party accepts the call invitation and establishes a call connection with the second call party, the first terminal corresponding to the first call party may display the invitation operation area. For example, an area 601 in FIG. 6 may be displayed. Further, an acceptance control 602 for accepting the virtual space invitation is displayed in the invitation operation area. When the first call party taps the acceptance control, the first terminal may display virtual space 603 and maintain the call between the at least two call parties in response to a tapping operation by the first call party. FIG. 6 is a schematic diagram of a virtual space invitation according to an embodiment.

In the above embodiment, diversity and flexibility of access to virtual space is enhanced by a fact that not only the virtual space may be entered via a virtual space entrance control, but also the virtual space may be entered by inviting a call party via an invitation operation area.

In one embodiment, the above method further includes: canceling display of the invitation operation area and maintaining the call between the at least two call parties in response to an invitation rejection operation triggered by the first call party in the invitation operation area.

Specifically, when the first call party does not want to enter the virtual space, the first call party may trigger the invitation rejection operation via the invitation operation area, so that the first terminal may cancel the display of the invitation operation area and maintain the call between the at least two call parties in response to the invitation rejection operation.

For example, refer to FIG. 6. An invitation operation area 601 may further display a talk later control 604. When the first terminal determines that the first call party taps the talk later control 604, the first terminal may consider an operation that the first call party taps the talk later control as the invitation rejection operation. Therefore, the first terminal cancels the display of the invitation operation area 601 and continues to maintain the call between the first call party and the second call party.

In this embodiment, regardless of whether the first call party accepts the virtual space invitation, the call between the first call party and the second call party may be maintained, so that the call between the first call party and the second call party is not interrupted. Not only is user experience improved, but also resources consumed for re-initiating a call are saved in this application, compared with that after the call between the first call party and the second call party is interrupted, the first call party needs to re-initiate a call with the second call party.

In one embodiment, the displayed virtual space belongs to the second call party among the at least two call parties. The above method further includes: switching, in response to a virtual space switching event triggered by the first call party, the displayed virtual space to virtual space indicated by the virtual space switching event.

Specifically, the second call party may enter its own virtual space and initiate the virtual space invitation to the first call party. When the first call party accepts the virtual space invitation, the first call party enters the virtual space of the second call party. Further, when the first call party desires to change the virtual space, the first call party may trigger the virtual space switching event. Therefore, the first terminal switches, in response to the virtual space switching event triggered by the first call party, the displayed virtual space to the virtual space indicated by the virtual space switching event.

Figure 7:
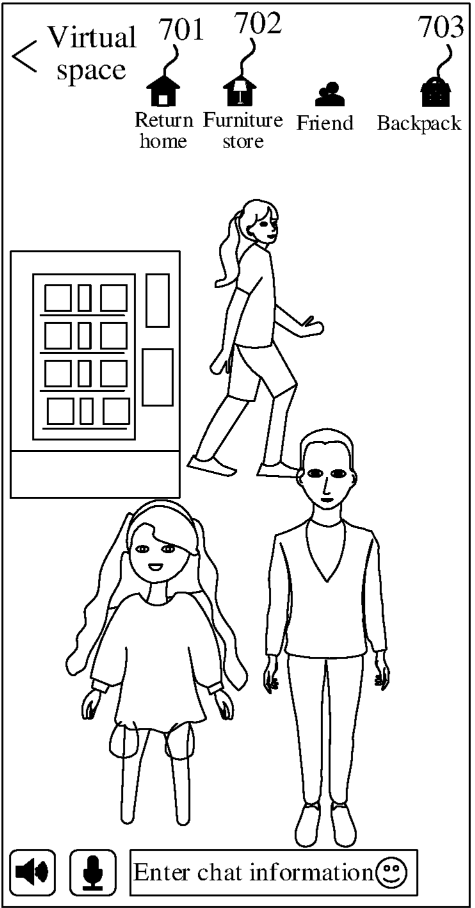
FIG. 7 is a schematic diagram of a virtual space switching control according to an embodiment.

In one embodiment, a virtual space switching control may be displayed in the virtual space. When the first call party is in the virtual space of the second call party, the first call party may tap the virtual space switching control. Therefore, the first terminal considers a tapping operation that the first call party taps the virtual space switching control as the virtual space switching event, and switches, in response to the virtual space switching event, the displayed virtual space to the virtual space indicated by the virtual space switching event. For example, refer to FIG. 7. The virtual space switching control may be a return home control 701. When the first call party taps the return home control, the first terminal may cancel display of the virtual space belonging to the second call party and switch to display of the virtual space belonging to the first call party. FIG. 7 is a schematic diagram of a virtual space switching control according to an embodiment.

In the above embodiments, because the displayed virtual space may be freely switched based on the virtual space switching event, this not only improves flexibility of virtual space display, but also improves diversity of displayed virtual space. In addition, the virtual space may be switched by only tapping the virtual space switching control, achieving a purpose of virtual space one-tap switching, thereby improving virtual space switching efficiency based on the virtual space one-tap switching.

In one embodiment, the displaying virtual space and maintaining a call between at least two call parties in a case that the at least two call parties are having the call includes: in a case that virtual space of a first call party is displayed and a call invitation from a second call party that is already in virtual space is received, continuing to display the virtual space of the first call party, and establishing and maintaining a call between the second call party and the first call party in response to an answer operation for the call invitation; the displaying a virtual avatar corresponding to at least one of the call parties in the virtual space includes: displaying a virtual avatar corresponding to the first call party in the virtual space of the first call party.

Specifically, the first call party and the second call party may have a call across virtual space. Before the first call party and the second call party establish a call connection, the first call party and the second call party may enter different virtual space respectively. For example, the first call party may enter its own virtual space, and the second call party may also enter its own virtual space. Further, the second call party may invite the first call party to have a call. In this case, the first terminal corresponding to the first call party may receive a call invitation from the second call party, so that the first call party may determine whether to accept the call invitation according to requirements. When the first terminal determines that the first call party accepts the call invitation, the first terminal establishes and maintains the call with the second call party in response to the answer operation for the call invitation, and continues to display the virtual space entered by the first call party, for example, continues to display the virtual space belonging to the first call party. It is easy to understand that when the first call party enters the virtual space, the first terminal may display the virtual avatar of the first call party in the virtual space entered by the first call party. For example, the first terminal may display the virtual avatar of the first call party in the virtual space belonging to the first call party.

In one embodiment, before the first call party and the second call party establish a communication connection, the first call party and the second call party may enter different virtual space respectively. For example, the first call party may enter virtual space of a first friend who is a friend of the first call party, and the second call party may also enter virtual space of a second friend who is a friend of the second call party. Therefore, when the first call party and the second call party establish the communication connection, the first call party and the second call party may have the call across rooms.

In one embodiment, when the first call party is already in a call state, the first call party may also receive the call invitation from the second call party that is already in the virtual space. When the first terminal determines that the first call party accepts the call invitation from the second call party, the first terminal may disconnect an existing communication connection of the first call party and re-establish the communication connection with the second call party.

In one embodiment, when the first call party and the second call party have the call across the virtual space, to simulate a call scenario in which there is a barrier between the first call party and the second call party, sound volumes of the first call party and second call party during the call may be reduced.

In the above embodiments, because the call can be performed even when the call parties are in different virtual space, a call barrier is broken and the diversity and flexibility of the call are improved. Compared with a case that call parties in different virtual space need to hang up a call first, then enter a same virtual space, and then re-initiate a call, in this embodiment, because the call may also be maintained in different virtual space, call resources consumed by the call parties for re-initiating a call after entering the same virtual space from different virtual space are saved. In one embodiment, the above method further includes: displaying at least one contact option of a first call party in response to a contact query operation triggered by the first call party among the at least two call parties; displaying virtual space of a target contact in response to a selection event made by the first call party for a target contact option in the at least one contact option in a case that the target contact represented by the target contact option is in the virtual space of the target contact; and displaying a virtual avatar corresponding to the target contact in the virtual space after switching.

Specifically, when the first call party desires to enter virtual space belonging to another person, the first call party may trigger the contact query operation, so that the first terminal may display the at least one contact option of the first call party in response to the contact query operation. The contact is a call party stored in advance that can make a call. For example, a call party may add a friend by using an instant messaging application in advance, so that a terminal may consider the friend added by using the instant messaging application as a contact. Further, when the first terminal displays the at least one contact option, the first call party may select the target contact option from the at least one contact option. The terminal may determine, in response to the selection event made by the first call party for the target contact option in the at least one contact option, whether the target contact represented by the target contact option is in the virtual space belonging to the target contact, and display the virtual space of the target contact when it is determined that the target contact is in the virtual space belonging to the target contact, and display a virtual avatar corresponding to the target contact and the virtual avatar corresponding to the first call party in the displayed virtual space. The contact option may be an identifier of the contact. For example, the contact option may be a name, an ID number, an avatar, or the like of the contact. It is easy to understand that the contact may be the second call party that has a call with the first call party, and the contact may alternatively be another user outside a call connection.

In one embodiment, the first call party may enter the virtual space of the target contact when not in any virtual space. The first call party may alternatively jump from the virtual space of the first call party to the virtual space of the target contact. The first call party may alternatively jump from other virtual space than the virtual space of the first call party to the virtual space of the target contact.

In one embodiment, a contact query control is displayed in the virtual space. When the first call party is in the virtual space, the first call party may trigger the first terminal to display the at least one contact option by tapping the contact query control. For example, refer to FIG. 8. The first terminal may display a contact query control (also referred to as a friend control) 801. When the first call party taps the contact query control 801, the first terminal may query the friend added by the first call party via the instant messaging application, consider the found friend as the contact, and display a contact option corresponding to the contact. For example, the first terminal may display a contact option list (also referred to as a friend list) 802 shown in FIG. 8, and display the at least one contact option via the contact option list.

Figure 8:
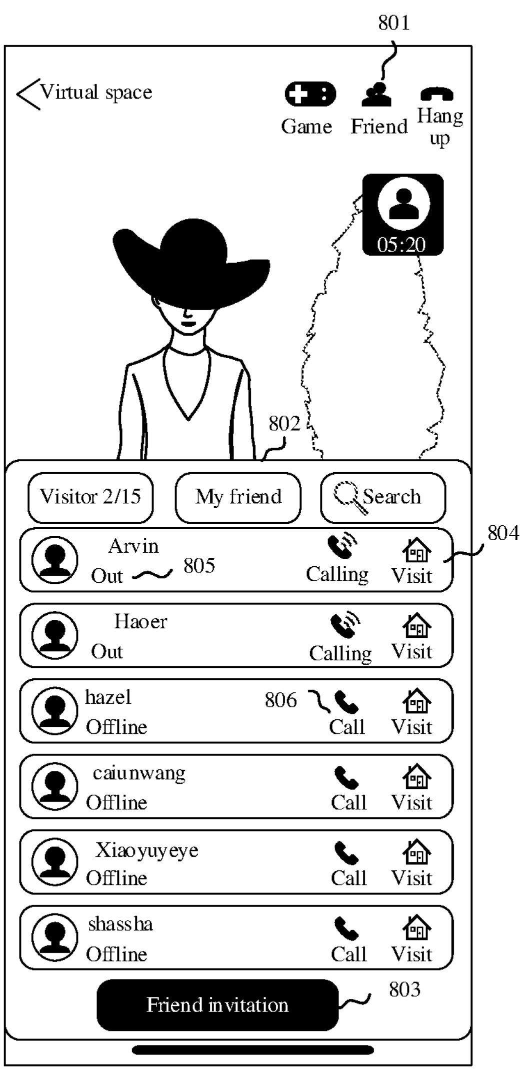
FIG. 8 is a schematic diagram of a contact option list according to an embodiment.

In one embodiment, refer to FIG. 8. The contact option list 802 may also display a contact invitation control (also referred to as a friend invitation control) 803. The first call party may invite a user that is not in a friend relationship with the first call party by using the contact invitation control (also referred to as the friend invitation control) 803. Therefore, when the user that is not in the friend relationship with the first call party accepts the invitation, the user and the first call party establish the friend relationship with each other, so that a contact option corresponding to the user may be displayed in the contact option list displayed on the first terminal.

In one embodiment, refer to FIG. 8. The contact option list 802 may further display a virtual space switching control (also referred to as a visit control) 804 corresponding to the contact option. The first call party may enter the virtual space corresponding to the target contact option by using the virtual space switching control 804.

In one embodiment, a contact state 805 may be displayed in the contact option list. The contact state may be used for indicating whether the contact is in its virtual space, or may be used for indicating whether the contact is logged in to the instant messaging application. The contact state includes being out, at home, offline, and the like. The being out indicates that the contact does not enter its own virtual space. The being at home indicates that the contact enters its own virtual space. The being offline indicates that the contact is not logged in to the instant messaging application. FIG. 8 is a schematic diagram of a contact option list according to an embodiment.

In one embodiment, the first terminal may not determine, in response to the selection event made by the first call party for the target contact option in the at least one contact option, whether the target contact represented by the target contact option is in the virtual space belonging to the target contact, directly display the virtual space of the target contact, and display the virtual avatar corresponding to the first call party in the displayed virtual space.

In the above embodiments, by displaying the at least one contact option, virtual space corresponding to each contact option may be freely entered based on the displayed at least one contact option, thereby improving switching flexibility and freedom of virtual space.

In one embodiment, the above method further includes: displaying at least one contact option of a first call party in response to a contact query operation triggered by the first call party among the at least two call parties; and adding, in response to a selection event made by the first call party for a target contact option in the at least one contact option, a virtual avatar corresponding to a target contact to the currently displayed virtual space in a case that the target contact represented by the target contact option is not in any virtual space.

Specifically, when the first call party is in the virtual space, the first call party may pull a contact that is not in the virtual space to the virtual space in which the first call party is located. More specifically, when the first call party enters the virtual space, the first call party may trigger the first terminal to display the at least one contact option. When the first terminal displays the at least one contact option, the first call party may select the target contact from the displayed at least one contact option. Therefore, the first terminal determines, in response to the selection event made by the first call party for the target contact option in the at least one contact option, whether the target contact corresponding to the target contact option is in the virtual space. The first terminal may add the virtual avatar corresponding to the target contact to the currently displayed virtual space in a case that the target contact represented by the target contact option is not in any virtual space.

In this embodiment, by directly pulling the contact into the virtual space, a process of a contact entering virtual space may be simplified, to improve efficiency of entering virtual space, thereby saving power resources consumed by a complicated process of entering virtual space.

In one embodiment, the above method further includes: adding, in response to the selection event made by the first call party for the target contact option, the target contact represented by the target contact option to one of the call and a new call, call parties of the new call including the first call party and the target contact.

Specifically, when the first call party and the second call party establish a call connection, and the first call party selects the target contact, the first terminal may add the target contact to the call between the first call party and the second call party. Alternatively, the first terminal may disconnect the call between the first call party and the second call party, and re-establish a call between the first call party and the target contact.

For example, refer to FIG. 8. The contact option list 802 displays a call control 806 corresponding to the contact option. When the first call party taps the call control 806 corresponding to the target contact, the first terminal may add the target contact represented by the target contact option to one of the existing call and the new call.

In this embodiment, because the target contact may be added to the call or a new call with the target contact may be established, diversity of calls is improved.

In one embodiment, the above method further includes: displaying an arrangement interface for the virtual space; displaying an arrangement option in response to a triggering operation for the arrangement interface; and displaying updated virtual space in response to a selection event for a target arrangement option among the arrangement option, an arrangement of the updated virtual space matching the target arrangement option.

Specifically, the first call party may arrange the virtual space. When the first call party enters the virtual space, the arrangement interface of the virtual space is displayed in the virtual space. When the first call party triggers the arrangement interface, the first terminal may display at least one arrangement option in response to the triggering operation for the arrangement interface. The first call party may select the target arrangement option from the at least one arrangement option, and the first terminal arranges, in response to the selection event for the target arrangement option among the arrangement option, the virtual space in an arrangement corresponding to the target arrangement option to obtain new virtual space. The arrangement option may be used for representing an arrangement configuration. For example, the arrangement option displayed on the first terminal may be a virtual table, a virtual chair, a virtual sofa, or the like. An arrangement option corresponding to the table represents that a new virtual table may be added in the virtual space, an arrangement option corresponding to the sofa represents that a new virtual sofa may be added in the virtual space, and the like.

In one embodiment, a plurality of virtual space entrance controls may be displayed in the virtual space. For example, refer to FIG. 7. The virtual space may display a first arrangement interface (also referred to as a furniture store) 702 and a second arrangement interface (also referred to as a backpack) 703. When the first call party taps the first arrangement interface, the first terminal may display a plurality of arrangement options. When the first call party taps a target arrangement option, the first terminal may transfer resources corresponding to the target arrangement option from an account of the first call party to a target account, and arrange the virtual space in a manner corresponding to the target arrangement option when the transfer is successful. When the first call party taps the second arrangement interface, the first terminal may further display a plurality of arrangement options. When the first call party taps a target arrangement option, the first terminal may directly arrange the virtual space in a manner corresponding to the target arrangement option. FIG. 7 is a schematic diagram of an arrangement interface according to an embodiment.

In one embodiment, the first call party may store a virtual item in the virtual space. For example, when the first call party expects the first terminal to cancel display of a virtual sofa in the virtual space, the first terminal may trigger a storage operation for the virtual sofa, so that the first terminal stores the virtual sofa into storage space corresponding to the second arrangement interface. For example, the first terminal stores the virtual sofa into the backpack, so that when the backpack is touched, in other words, when the backpack is opened, an icon of the virtual sofa may be displayed.

In the above embodiments, by arranging the virtual space, content in the virtual space may be enriched, so that a virtual avatar may perform richer interactive operations via the virtual space with the richer content, thereby improving resource utilization efficiency.

In one embodiment, the method includes: displaying an input area, and displaying, in response to an input event triggered in the input area, information indicated by the input event in an information display area in the virtual space.

Figure 9:
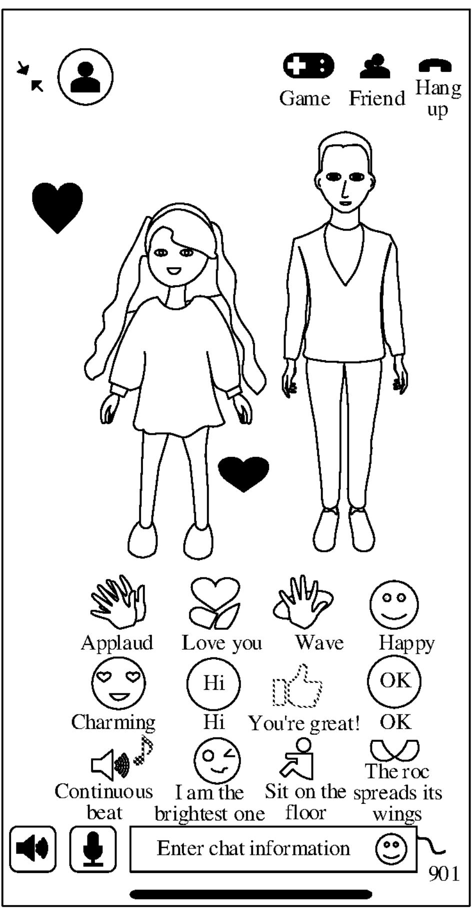
FIG. 9 is a schematic diagram of an input area according to an embodiment.

Specifically, the first call party may further interact with a virtual avatar in the virtual space via the input area displayed in the virtual space. For example, refer to FIG. 9. An input area 901 is displayed in the virtual space, and the first call party may edit text, pictures, emoticons, and the like via the input area. When the first call party completes editing information, the first call party may trigger the first terminal to send the edited information, so that a terminal corresponding to another virtual avatar in the virtual space may display the information sent by the first call party. For example, when a call party A establishes a communication connection with a call party B, and the call party A and the call party B are both in virtual space belonging to the call party B, in this case, the call party B may invite a contact C to enter the virtual space. When the call party A inputs information via the input area and sends the inputted information, a terminal corresponding to the call party B and a terminal corresponding to the contact C both display the information sent by the call party A. FIG. 9 is a schematic diagram of an input area according to an embodiment.

In one embodiment, the information indicated by the input event can be information such as text, an emoticon, a picture, or a sound.

In one embodiment, the first call party may trigger the first terminal to hide the input area. In this case, the first terminal cancels the display of the input area in response to a hide event triggered for the input area, and switches to displaying an area identifier corresponding to the input area. When the first call party taps the area identifier, the first terminal may switch from displaying the area identifier to displaying the input area.

In the above embodiments, because the input area is displayed, information exchange with a user that enters the same virtual space via the input area may be conveniently and quickly performed, thereby improving efficiency of information exchange.

In one embodiment, the at least two call parties include a first call party and a second call party. In a case that the first call party and the second call party are both in the virtual space, a sound received by the first call party and belonging to the second call party in the call is associated with a positional relationship between the first call party and the second call party relative to the virtual space.

Specifically, in a case the first call party and the second call party establish a communication connection, and both the first call party and the second call party are in the virtual space, the sound received by the first call party and belonging to the second call party is associated with the positional relationship between the first call party and the second call party relative to the virtual space For example, the sound received by the first call party and belonging to the second call party may change as the spatial distance between the first call party and the second call party in the virtual space changes.

In one embodiment, a larger spatial distance between a first virtual position and a second virtual position indicates a lower sound received by the first call party and belonging to the second call party; the first virtual position is a position of the first call party in the virtual space; and the second virtual position is a position of the second call party in the virtual space.

The first terminal may determine the first virtual position of the first call party in the virtual space, the second virtual position of the second call party in the virtual space, and the spatial distance between the first virtual position and the second virtual position. The lager spatial distance indicates that a distance between the virtual avatar corresponding to the first call party and the virtual avatar corresponding to the second call party is larger. In this case, the sound received by the first call party and belonging to the second call party is lower. Correspondingly, when the spatial distance is smaller, the sound received by the first call party and belonging to the second call party is louder.

In one embodiment, in a case the first call party and the second call party establish the communication connection, and both the first call party and the second call party are in the virtual space, the first terminal may determine whether the first call party and the second call party are in different virtual space. If the first call party and the second call party are in different virtual space, the sound received by the first call party and belonging to the second call party may also be attenuated.

In one embodiment, the first terminal may determine whether there is a barrier between the virtual avatar corresponding to the first call party and the virtual avatar corresponding to the second call party. If there is a barrier, the sound received by the first call party and belonging to the second call party may also be attenuated. The barrier may be a virtual wall in the virtual space.

In the above embodiments, by associating the sound volume with the positional relationship, senses of space and depth of the sound may be provided, thereby enhancing a call party's sense of presence and authenticity. Because the sound volume may be adjusted based on the positional relationship, resources consumed when the sound is played are fully utilized and resource utilization efficiency is improved.

In one embodiment, the triggering, in response to an interaction triggering event for the at least one virtual avatar, a virtual avatar indicated by the interaction triggering event among the at least one virtual avatar to perform an interactive action in the virtual space includes: displaying, in response to an action indicating operation for the at least one virtual avatar, that the at least one virtual avatar performs an action indicated by the action indicating operation in the virtual space.

Specifically, when the first call party is in the virtual space, the first call party may trigger the virtual avatar in the virtual space to perform a corresponding action. For example, the first call party may trigger the action indicating operation for the virtual avatar, so that the first terminal triggers, in response to the action indicating operation for the virtual avatar, the virtual avatar to perform the action indicated by the action indicating operation in the virtual space.

In one embodiment, the action indicated by the action indicating operation may be walking, running, squatting, hugging, hands shaking, applauding, and the like. For example, when the first call party is in the virtual space, the first call party may drag the virtual avatar corresponding to the first call party, so that the virtual avatar corresponding to the first call party may move in a dragging direction by the first call party. For another example, a hug control may be displayed in the virtual space, and the first call party may use the hug control to control a virtual avatar in the same virtual space to perform a hug action. Furthermore, when the first call party is in the virtual space, a steering wheel may be displayed in the virtual space, and the first call party may be controlled to move by using the steering wheel.

In one embodiment, the first call party may only control the virtual avatar corresponding to the first call party to perform the action indicated by the action indicating operation. The first call party may also control another virtual avatar other than the virtual avatar corresponding to the first call party to perform the action indicated by the action indicating operation.

In the above embodiments, by controlling the virtual avatar to perform the action indicated by the action indicating operation, the virtual avatar may be enabled to perform interaction based on the performed action, thereby improving diversity of interaction. In addition, audio and a video are generally used as information carriers, and interaction between friends is mostly just visual and sound effects superimposed on a screen, so that richer forms of interaction cannot be produced. This application is not limited to having a call with a friend in a call application. Traveling between real space and virtual space, having a call with a friend in different space, and even becoming a virtual avatar with a friend in the virtual space while having a call and making interaction may be achieved. Therefore, an interactive method changing audio and video calls from a two-dimensional plane to a three-dimensional space is implemented, and interaction such as watching together and partying together is materialized, thereby achieving richer forms of interaction and providing richer call functions. Compared with the traditional solution of only using collection and transmission functions of a device, in this embodiment, call resources of a device are fully used by providing richer call functions.

In one embodiment, the at least two call parties include a first call party and a second call party. A first virtual avatar corresponding to the first call party and a second virtual avatar corresponding to the second call party are displayed in the virtual space. The triggering, in response to an interaction triggering event for the at least one virtual avatar, a virtual avatar indicated by the interaction triggering event among the at least one virtual avatar to perform an interactive action in the virtual space includes: displaying a virtual interaction area in the virtual space; and triggering virtual interaction between the first virtual avatar and the second virtual avatar in the virtual interaction area.

Specifically, the virtual interaction area may be displayed in the virtual space. When the first call party controls the first virtual avatar to enter the virtual interaction area, the first terminal may trigger the virtual interaction between the first virtual avatar and the second virtual avatar in the virtual interaction area. The virtual interaction may be watching a movie together, playing a game together, raising a virtual pet together, and the like.

In one embodiment, an entrance to the virtual interaction area may be displayed in the virtual space, and the first call party may control the first terminal to display the virtual interaction area by using the entrance to the virtual interaction area.

In one embodiment, when the first terminal enters the virtual interaction area, the first call party may send, to the second call party, an area invitation for entering the interaction area. When the second call party accepts the area invitation, the terminal corresponding to the second call party may also display a virtual interaction area and display the second virtual avatar in the virtual interaction area.

Figure 10:
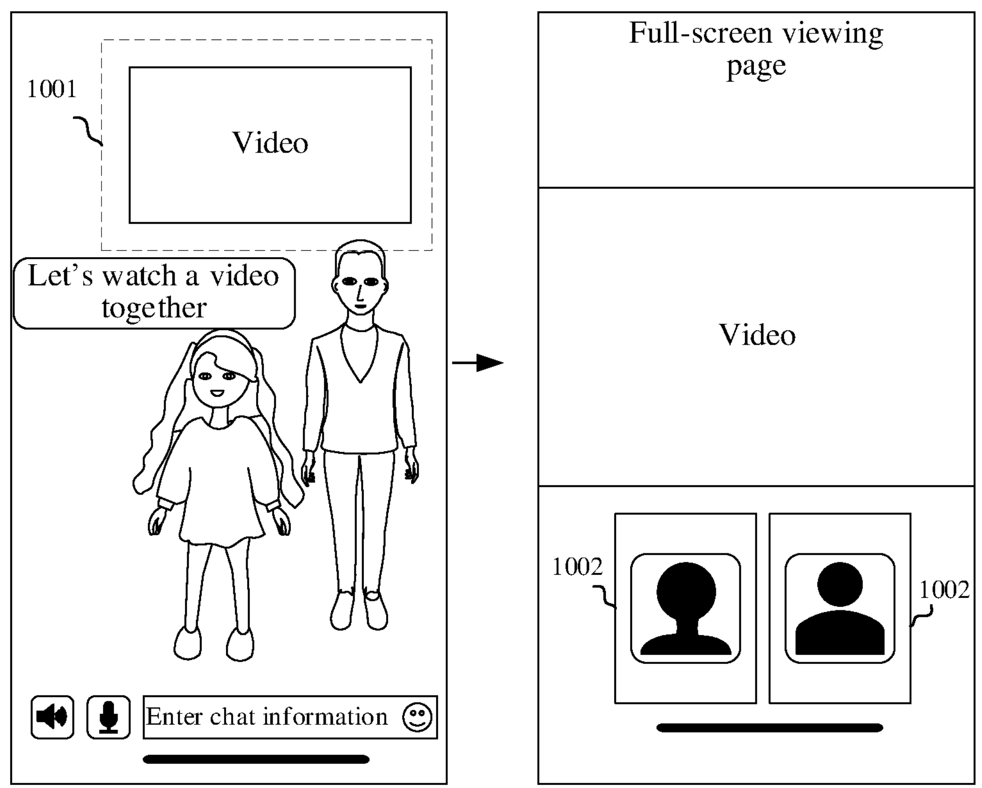
FIG. 10 is a schematic diagram of a virtual interaction area according to an embodiment.

In one embodiment, when the first call party controls the first virtual avatar to approach the virtual interaction area, the first terminal may display prompt information to prompt, based on the prompt information, the first call party to trigger the virtual interaction between the first virtual avatar and the second virtual avatar in the virtual interaction area. For example, refer to FIG. 10. The virtual interaction area may be specifically an area 1001 in the virtual space in which a virtual TV is displayed. When it is determined that the first call party approaches the virtual TV, the first terminal may display "Let's watch a movie together" prompt information to prompt, based on the prompt information, the first call party to watch a movie with the second call party via the virtual TV. When the first call party triggers a triggering operation for the virtual TV, the first terminal may control a first virtual object and a second virtual object to sit together in front of the virtual TV and watch a movie. The first call party may further control the first terminal to display a movie screen in full screen. For example, when the first call party taps a full screen control, the first terminal may display a full-screen viewing page, and display avatars 1002 corresponding to the first virtual object and the second virtual object in the full-screen viewing page. FIG. 10 is a schematic diagram of a virtual interaction area according to an embodiment.

Figure 11:
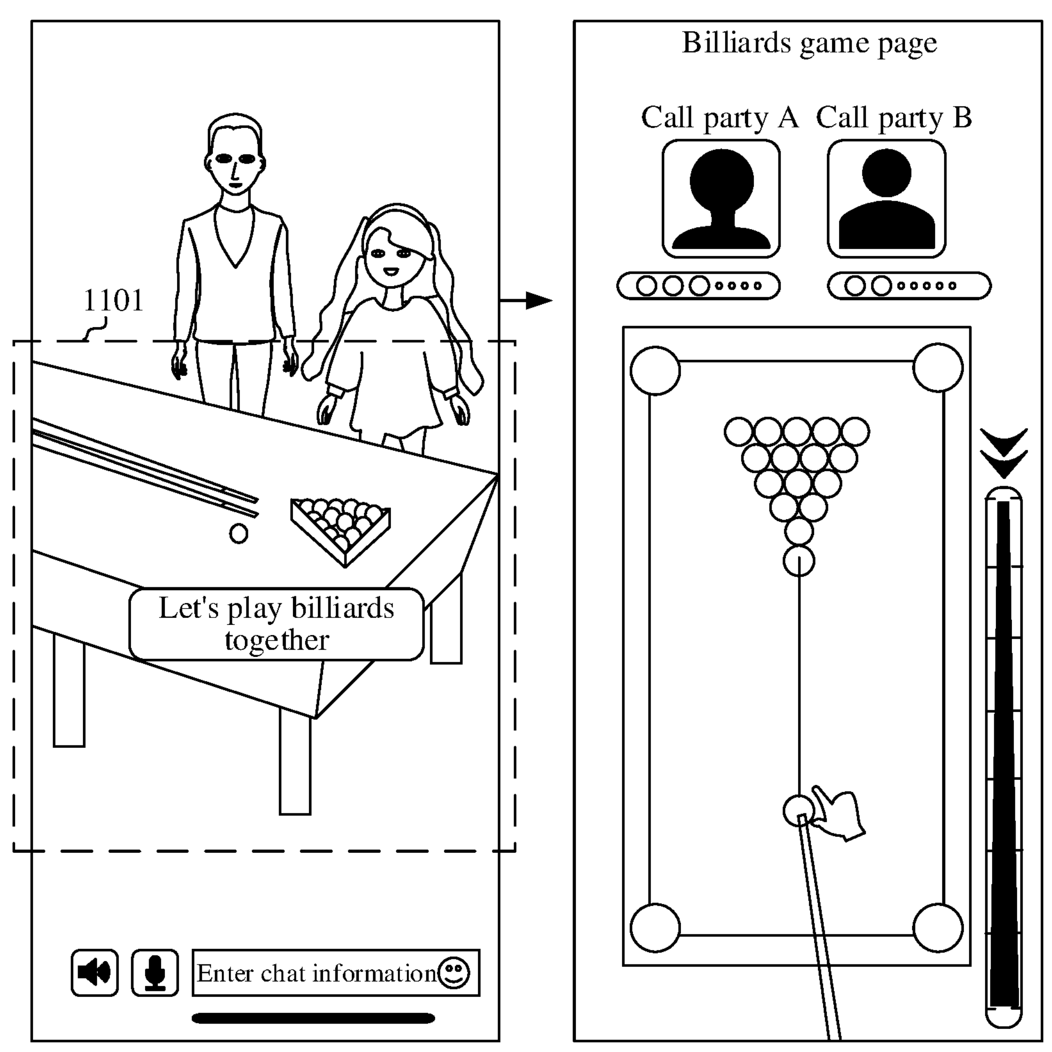
FIG. 11 is a schematic diagram of a virtual interaction area according to another embodiment.

In one embodiment, refer to FIG. 11. The virtual interaction area may be specifically an area 1101 in which a virtual billiard table is located in the virtual space. When it is determined that the first call party approaches the virtual billiard table, the first terminal may display "Let's play billiards together" prompt information to prompt, based on the prompt information, the first call party to enter a billiards game with the second call party. When the first call party triggers a triggering operation for the virtual billiard table, the first virtual object and the second virtual object may enter the billiards game. In this case, both the first terminal and the second terminal may display a billiards game page 1102. FIG. 11 is a schematic diagram of a virtual interaction area according to another embodiment.

In the above embodiments, by displaying the virtual interaction area, the virtual interaction between the first virtual avatar and the second virtual avatar may be triggered in the virtual interaction area, to provide more opportunities for interaction between the plurality of call parties, thereby making full use of the device of the call party and improving resource utilization efficiency.

In one embodiment, the method includes: determining a target call party that enters the virtual space among the plurality of second call parties and determining a non-target call party that does not enter the virtual space among the plurality of second call parties in a case that the first call party enters the virtual space; creating a dedicated audio channel corresponding to each target call party; and receiving a sound of the corresponding target call party via the dedicated audio channel and receiving a sound of each non-target call party via a preset public audio channel.

Specifically, in a case that the first call party does not enter the virtual space, in other words, the first call party is in real space, when the first call party conducts a group chat with the second call parties, the first terminal corresponding to the first call party may synthesize received sounds of the second call parties into a single audio track, that is, combine sounds of the second call parties to obtain a combined sound, and play the combined sound, so that the first call party may listen to the played combined sound.

In a case that the first call party enters the virtual space, the first terminal may load a scene of the virtual space, and obtain a list of members currently on the call after the loading is completed. The first terminal may determine a second call party that has entered the virtual space from the list of members currently on the call, and consider the second call party that has entered the virtual space as the target call party. When determining the target call party, the first terminal may further determine a second call party that has not entered the virtual space, and consider the second call party that has not entered the virtual space as a non-target call party.

Further, the first terminal creates the dedicated audio channel corresponding to each target call party, and receives the sound of the corresponding target call party via the dedicated audio channel. For example, a sound of a call party A is received via a dedicated audio channel of the call party A, and a sound of a call party B is received via a dedicated audio channel of the call party B. The first terminal may further receive the combined sound including the sounds of non-target call parties via the preset public audio channel. For example, when a call party C and a call party D do not enter the virtual space, the first terminal may receive a sound of the call party C and a sound of the call party D via the public audio channel, synthesize the sound of the call party C and the sound of the call party D into a single audio track, and play the single audio track via a playback module.

In one embodiment, in a case that the first call party enters the virtual space, the first terminal may further create a dedicated audio channel corresponding to the first call party, and collect a sound of the first call party via the dedicated audio channel of the first call party, and send the sound of the first call party to each second call party.

In one embodiment, when a call party is in the virtual space, a dedicated audio channel corresponding to the call party may be created. Therefore, a sound in each dedicated audio channel may be modified separately. For example, a 3D effect of a sound may be added to a dedicated audio channel, thereby providing enhancing senses of space and depth of the sound.

In one embodiment, in a case that both the first call party and the target call party enter the virtual space, the first terminal may determine position information of the first call party in the virtual space, determine position information of the target call party in the virtual space, determine a positional relationship between the first call party and the target call party relative to the virtual space based on the position information of the first call party in the virtual space and the position information of the target call party in the virtual space, and modify, based on the positional relationship, the sound in the dedicated audio channel corresponding to the target call party. Accordingly, the sound received by the first call party and belonging to the target call party in the call can be associated with the positional relationship between the first call party and the target call party relative to the virtual space. For example, when the first call party and a target call party A are in different virtual space, the first terminal may adjust a sound volume in a dedicated audio channel corresponding to the target call party A to reduce the sound volume of the target call party A.

Figure 12:
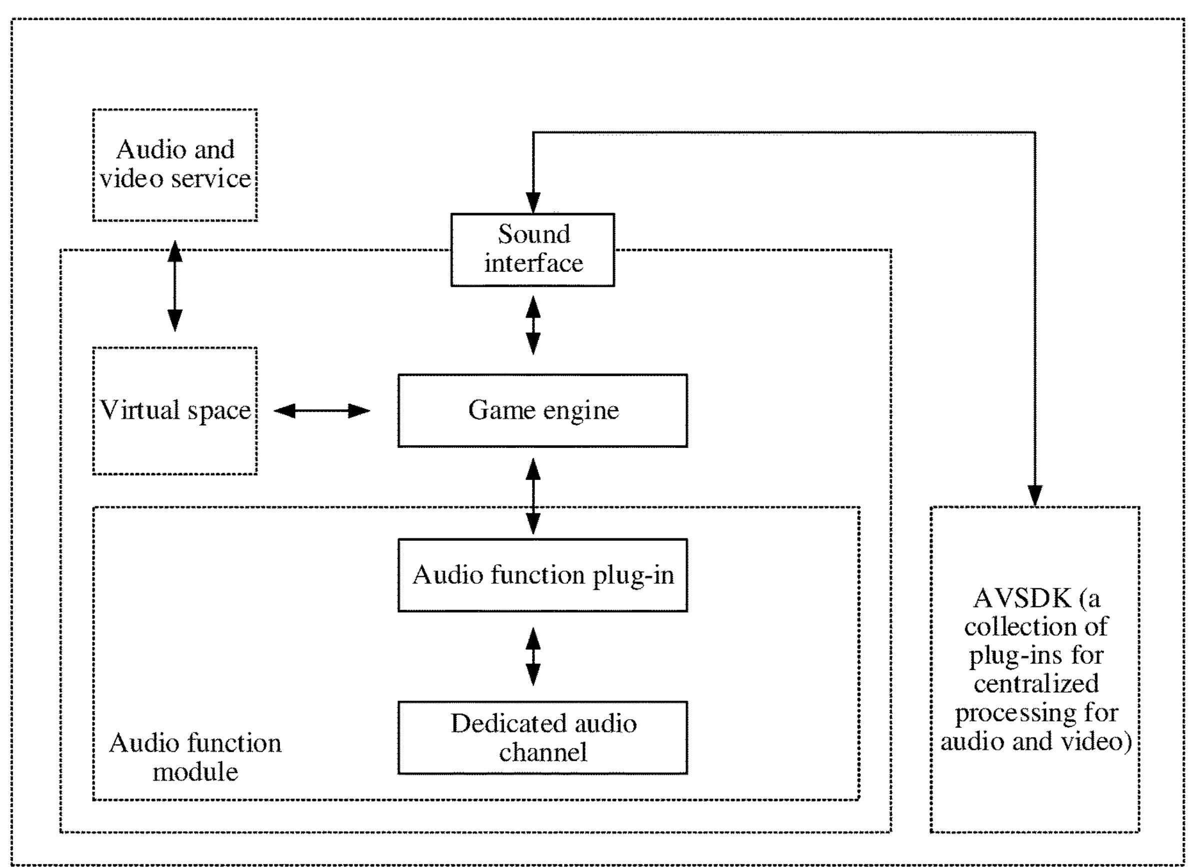
FIG. 12 is a schematic diagram of an overall architecture of a call interaction method according to an embodiment.

In one embodiment, a game engine (also referred to as an unreal engine plug-in) may be integrated in an instant messaging application, and the virtual space may be created by using the game engine. The game engine includes an audio function module. A call sound in the instant messaging application may be processed and transmitted to the virtual space by using the audio function module of the game engine, thereby achieving a call scene between real space and the virtual space. In addition, the sound may be modified by using the audio function module in the game engine to add a sound effect to the sound. For example, refer to FIG. 12. When a microphone in the first terminal receives the sound of the first call party, the first terminal may transmit the received sound to the game engine, and transmit the sound to the audio function module via the game engine, so that the audio function module sends the sound of the first call party to a server, to forward the sound of the first call party to the second call party via the server. Correspondingly, the audio function module of the game engine may further receive a sound of the second call party and send the sound of the second call party to a speaker for playback. FIG. 12 is a schematic diagram of an overall architecture of a call interaction method according to an embodiment.

Figure 13:
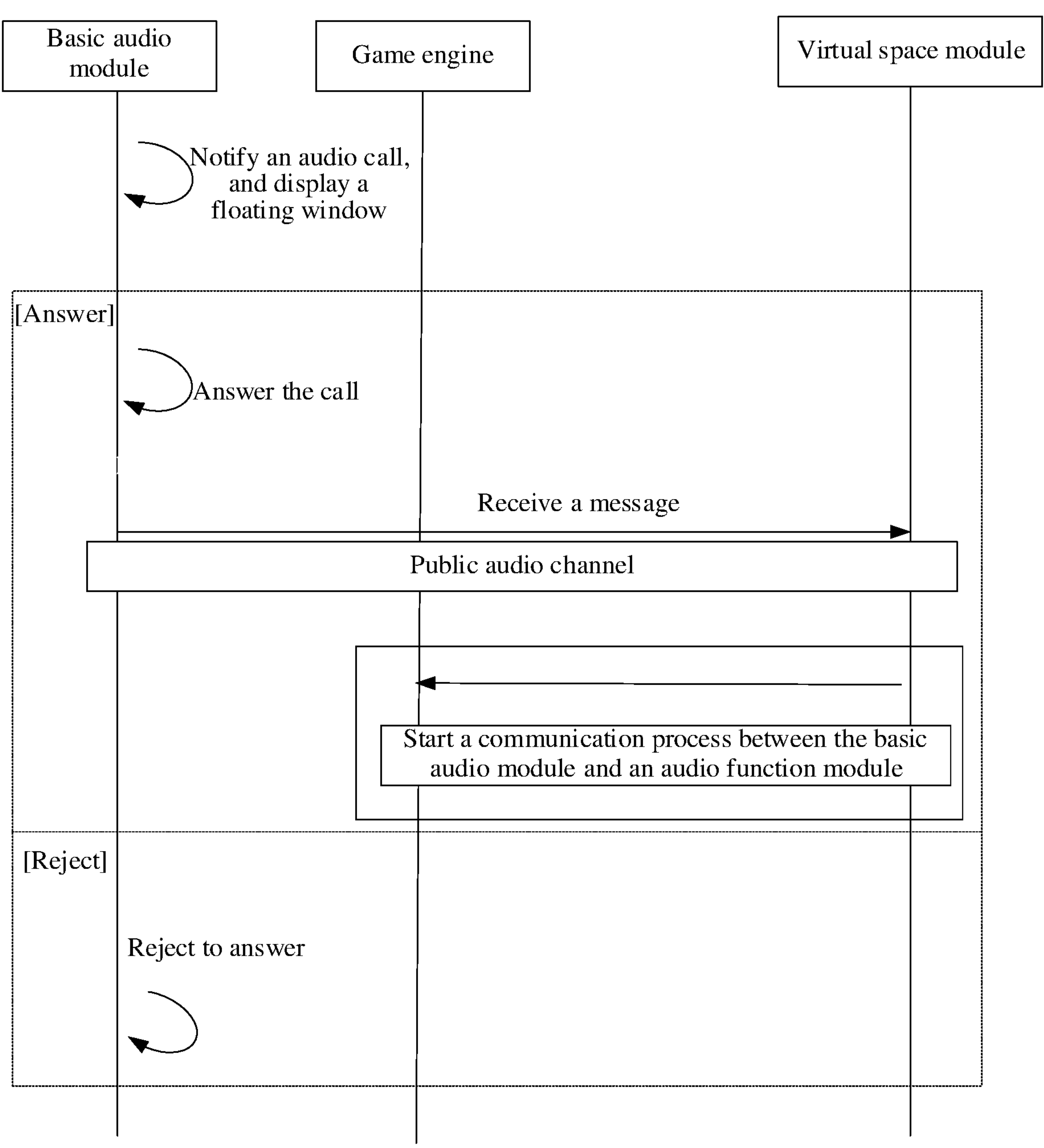
FIG. 13 is a schematic diagram of interaction between modules in a call interaction system according to an embodiment.

In one embodiment, refer to FIG. 13. A call-based interaction system includes a basic audio module, a game engine (also referred to as an unreal engine plug-in), and a virtual space module (also known as a virtual space service script) of an instant messaging application. When a first call party is in virtual space and a second call party in virtual space initiates a call to the first call party via the instant messaging application, the first call party may choose to answer the call, or choose to reject the call. When the first call party chooses to answer the call, the basic audio module may send, via a public audio channel, a message received by the first call party to the virtual space module, so that the virtual space module may trigger the game engine to start a communication process between the basic audio module and an audio function module. In other words, the virtual space module may trigger the basic audio module in the game engine to create a dedicated audio channel for the second call party, and receive a sound of the second call party transmitted by the basic audio module via the dedicated audio channel. When the first call party chooses to reject the call, the virtual space module may not trigger the game engine to start an audio function module to create a dedicated audio channel. FIG. 13 is a schematic diagram of interaction between modules in a call interaction system according to an embodiment.

Figure 14:
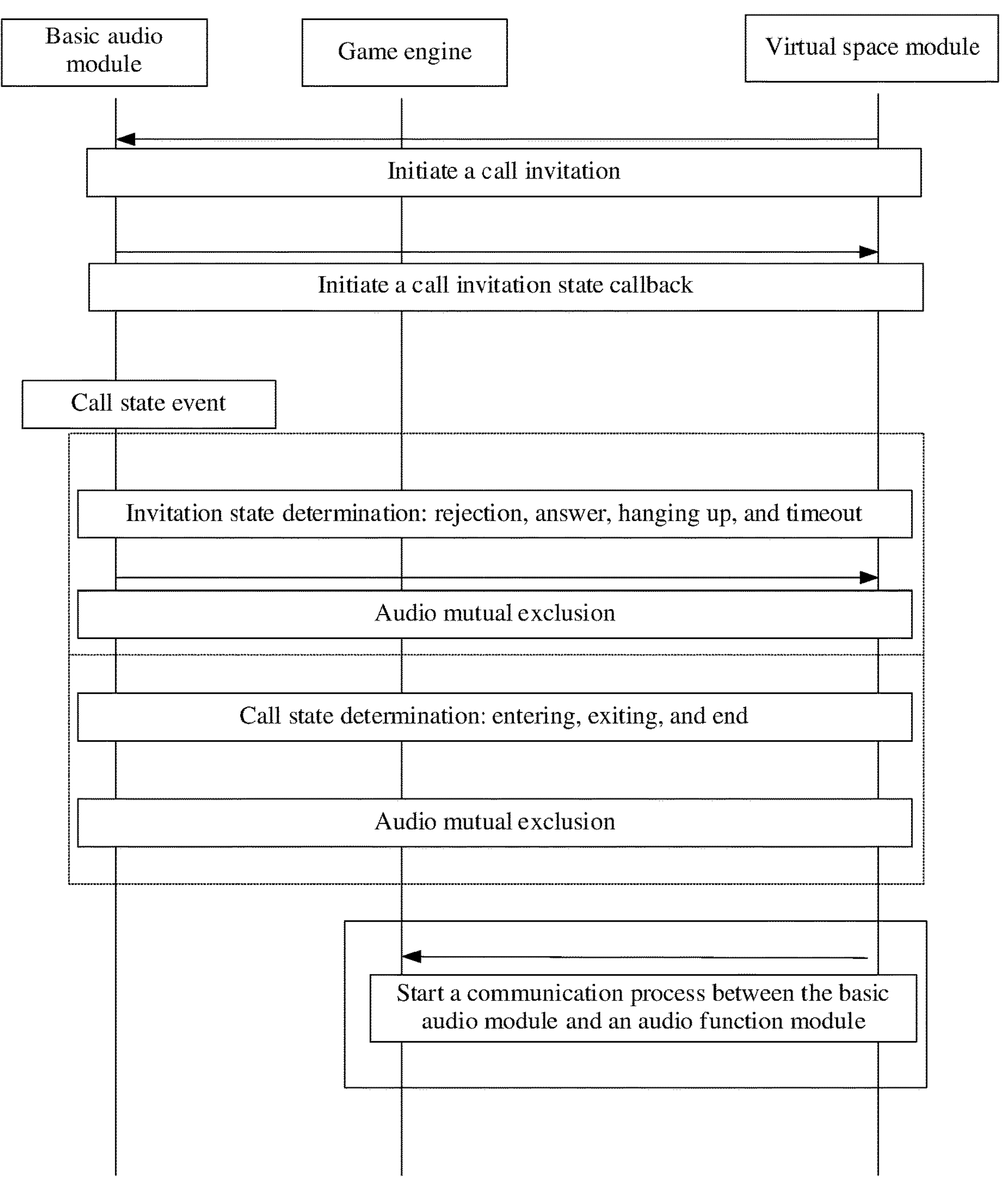
FIG. 14 is a schematic diagram of interaction between modules in a call interaction system according to another embodiment.

In one embodiment, refer to FIG. 14. When the first call party is in virtual space, the first call party may initiate a call invitation to a second call party via a virtual space module, and the virtual space module can check an invitation state of the call invitation by using a callback function. The invitation state includes rejection, answer, hanging up, invitation timeout, or the like. When the second call party accepts the call invitation, a first terminal may perform an audio mutual exclusion operation. To be specific, the first terminal determines whether the first call party or the second call party has an answered historical call. If there is an answered historical call, then the first terminal hangs up the historical call and establishes a call connection between the first call party and the second call party. Further, the first terminal may further determine a call state. The call state includes entering the virtual space, exiting the virtual space, ending the call, and the like. When it is determined that the second call party also enters the virtual space, the virtual space module triggers a game engine to create a dedicated audio channel corresponding to the second call party, and performs the call via the dedicated audio channel. FIG. 14 is a schematic diagram of interaction between modules in a call interaction system according to another embodiment.

In the above embodiments, by creating a dedicated audio channel, compared with synthesizing audio of all call parties into a single audio track, in this application, audio in a dedicated audio channel is individually modified, so that the audio received by a call party has a corresponding sound effect, thereby providing a richer depth of sound.

In one embodiment, the creating a dedicated audio channel corresponding to each target call party includes: determining a real identity identifier of the target call party in real space and determining a virtual identity identifier of the target call party in the virtual space; and binding the real identity identifier to the virtual identity identifier to obtain binding information and generating the dedicated audio channel for the target call party based on the binding information.

Specifically, when it is determined that the target call party is in the virtual space, the first terminal may determine the real identity identifier of the target call party in the real space. The real space is space where the call party is located when the call party does not enter the virtual space The real identity identifier is an identifier of the call party in the real space. For example, the real identity identifier may be specifically an account identifier of a user account created by the call party in the instant messaging application. The virtual identity identifier is an identifier of the call party in the virtual space. For example, the virtual identity identifier may be an avatar identifier of a virtual avatar corresponding to the call party, or a role identifier of a role instance created by the call party in the virtual space. Further, the first terminal binds the real identity identifier to the virtual identity identifier of the target call party to obtain the binding information, and creates a dedicated audio channel corresponding to each target call party based on the binding information.

Figure 15:
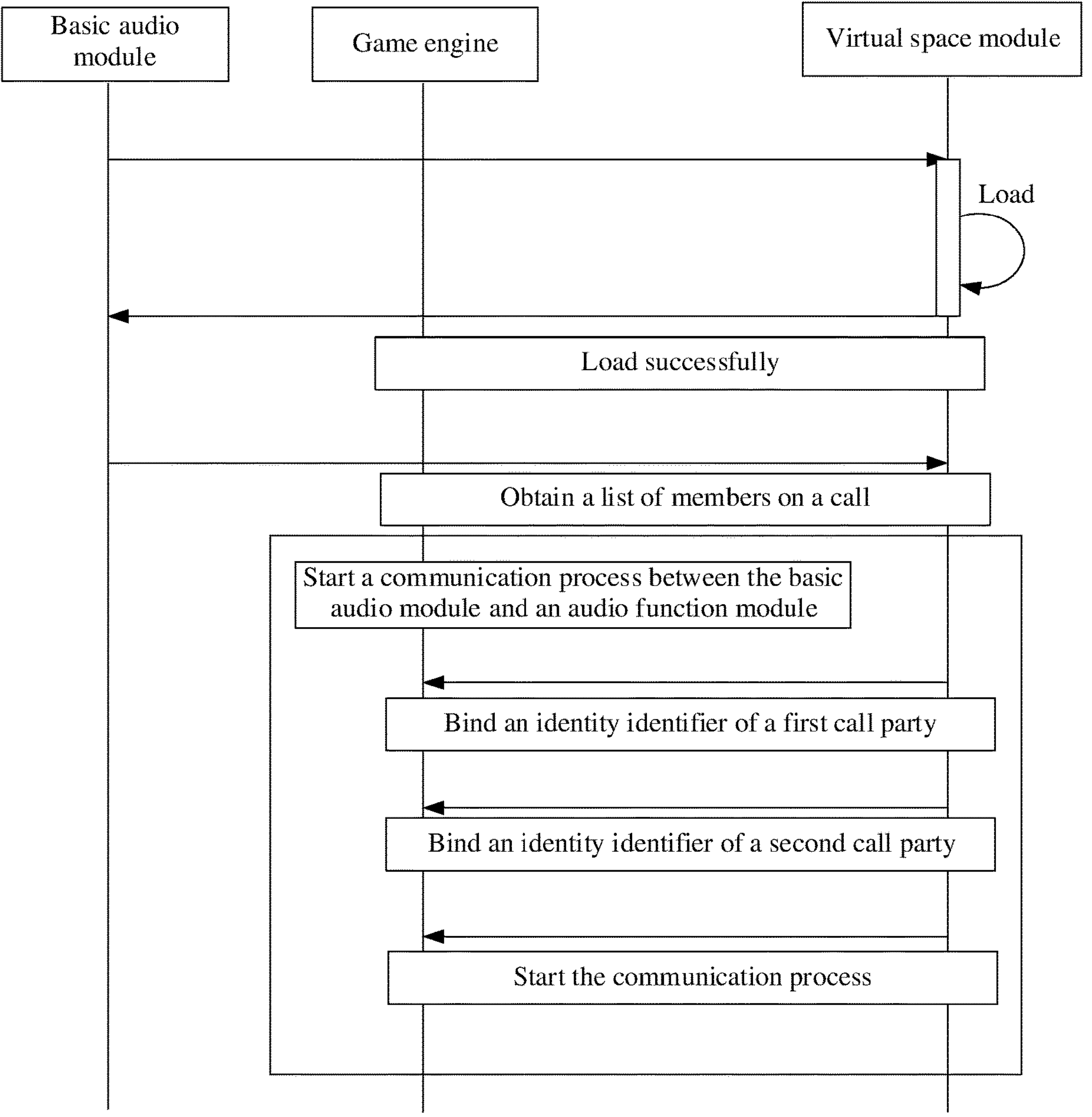
FIG. 15 is a schematic diagram of interaction of identity identifier binding according to an embodiment.

In one embodiment, refer to FIG. 15. When a first call party enters virtual space from audio and video, a first terminal first loads a scene of the virtual space, and determines a second call party having a call with the first call party after the loading is completed. The first terminal determines a real identity identifier of the first call party in the real space and a virtual identity identifier of the first call party in the virtual space, and binds the real identity identifier of the first call party in the real space to the virtual identity identifier of the first call party in the virtual space, to obtain first binding information, and sends the first binding information to an audio function module in a game engine, so that the audio function module may create a dedicated audio channel corresponding to the first call party, and use the dedicated audio channel to receive a sound of the first call party. The first terminal determines a real identity identifier of the second call party in the real space and a virtual identity identifier of the second call party in the virtual space, and binds the real identity identifier of the second call party in the real space to the virtual identity identifier of the second call party in the virtual space, to obtain second binding information, and sends the second binding information to an audio function module in the game engine, so that the audio function module may create a dedicated audio channel corresponding to the second call party, and use the dedicated audio channel to receive a sound of the second call party. FIG. 15 is a schematic diagram of interaction of identity identifier binding according to an embodiment.

In one embodiment, when the second terminal sends the sound of the second call party to the server, the server may send the sound carrying the real identity identifier of the second call party to the first terminal. The first terminal may receive the sound carrying the real identity identifier via the basic audio module, and send the sound carrying the real identity identifier to the audio function module. When the audio function module receives the sound, the audio function module may determine, based on the binding information, the virtual identity identifier corresponding to the carried real identity identifier, route the sound to the dedicated audio channel corresponding to the virtual identity identifier, adjust, based on the positional relationship between the first call party and the second call party in the virtual space, a sound volume in the dedicated audio channel, and send the adjusted sound to the speaker for playback.

Figure 16:
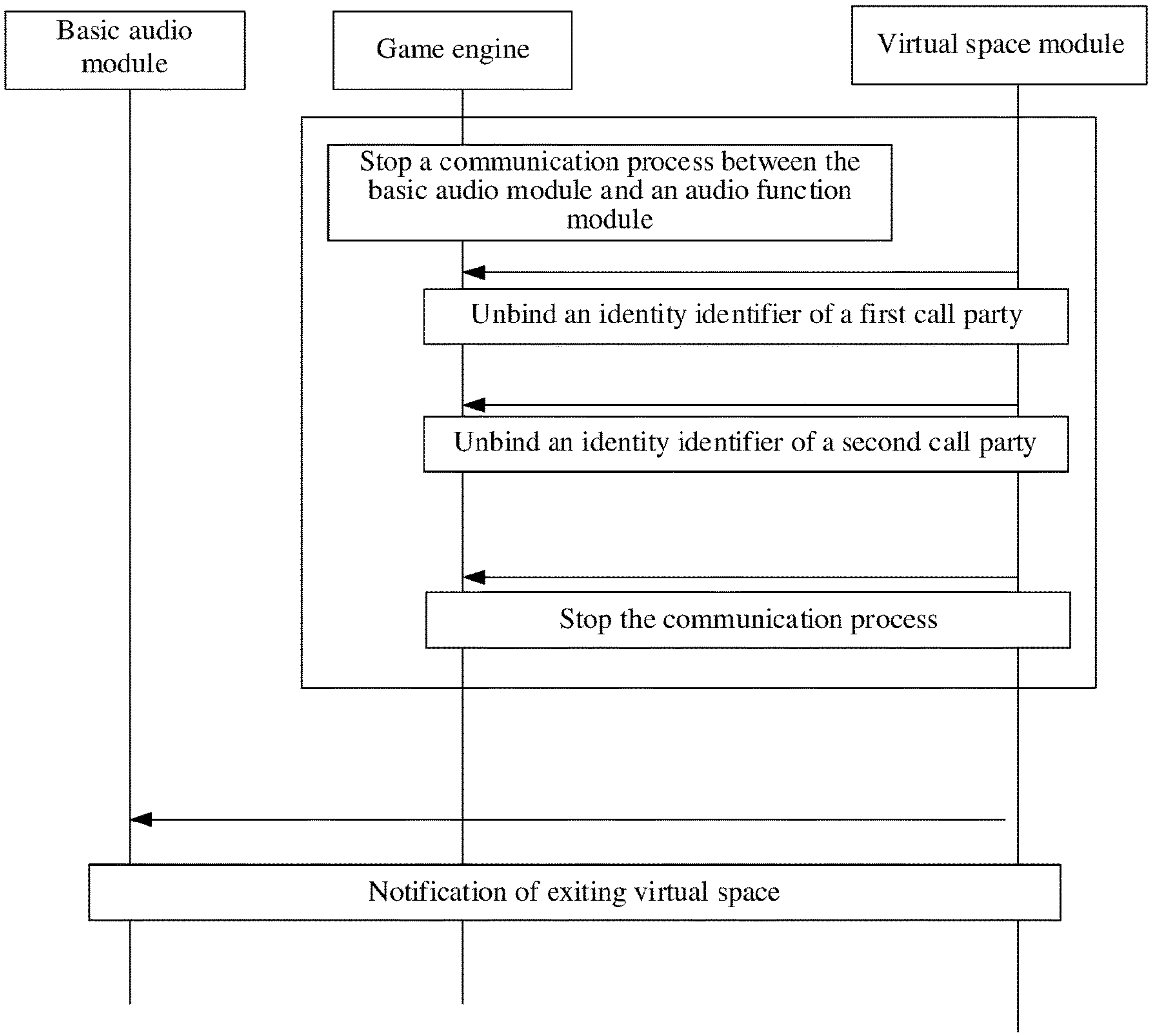
FIG. 16 is a schematic diagram of interaction of unbinding an identity identifier according to an embodiment.

In one embodiment, refer to FIG. 16. When exiting a call, a first terminal may unbind an identity identifier and stop transmitting a sound received by a basic audio module to an audio function module, that is, stop a communication process between the basic audio module and the audio function module. FIG. 16 is a schematic diagram of interaction of unbinding an identity identifier according to an embodiment.

In the above embodiments, by binding a real identity identifier and a virtual identity identifier, binding information that can represent both the real identity identifier and the virtual identity identifier may be obtained. Therefore, a dedicated audio channel generated based on the binding information not only can correspond to a target user based on the real identity identifier, but also can correspond to the target user based on the virtual identity identifier. Accordingly, flexibility of determining a target user by a dedicated audio channel is greatly improved.

In one embodiment, refer to FIG. 17. A schematic flowchart of a call interaction method is provided. The call-based interaction method includes:

S1702. Display a call interface corresponding to a first call party among at least two call parties in a case that the at least two call parties are having a call; and display, in a case that a virtual space invitation from a second call party among the at least two call parties is received, an invitation operation area for the virtual space invitation.

S1704. Display virtual space in response to an invitation acceptance operation triggered by the first call party among the at least two call parties in the invitation operation area.

S1706. At least display a virtual avatar corresponding to the first call party in the virtual space and maintain the call between the at least two call parties. The at least two call parties include the first call party and the second call party. In a case that the first call party and the second call party are both in the virtual space, a sound received by the first call party and belonging to the second call party in the call is associated with a positional relationship between the first call party and the second call party relative to the virtual space.

S1708. Display at least one contact option of the first call party in response to a contact query operation triggered by the first call party among the at least two call parties.

S1710. Add, in response to a selection event made by the first call party for a target contact option, a target contact represented by the target contact option to one of the call and a new call. Call parties of the new call include the first call party and the target contact.

S1712. Display an arrangement interface for the virtual space; display an arrangement option in response to a triggering operation for the arrangement interface; and display updated virtual space in response to a selection event for a target arrangement option among the arrangement option, an arrangement of the updated virtual space matching the target arrangement option.

S1714. Display, in response to an action indicating operation for at least one virtual avatar, that the at least one virtual avatar performs an action indicated by the action indicating operation in the virtual space.

S1716. Display a virtual interaction area in the virtual space, and trigger virtual interaction between a first virtual avatar and a second virtual avatar in the virtual interaction area.

It is to be understood that, although the steps are displayed sequentially according to the instructions of the arrows in the flowcharts of the embodiments, these steps are not necessarily performed sequentially according to the sequence instructed by the arrows. Unless otherwise explicitly specified in this application, execution of the steps is not strictly limited, and the steps may be performed in other sequences. Moreover, at least some of the steps in each embodiment may include a plurality of steps or a plurality of stages. The steps or stages are not necessarily performed at the same moment but may be performed at different moments. Execution of the steps or stages is not necessarily sequentially performed, but may be performed alternately with other steps or at least some of steps or stages of other steps.

Based on the same inventive concept, embodiments of this application further provide a call-based interaction apparatus for implementing the above call-based interaction method. An implementation solution provided by the apparatus for solving the problem is similar to the implementation solution recorded in the above method. Therefore, for specific limitations on one or more call-based interaction apparatus embodiments provided below, refer to the limitations on the above call-based interaction method. Details are not described herein again.

Figure 18:
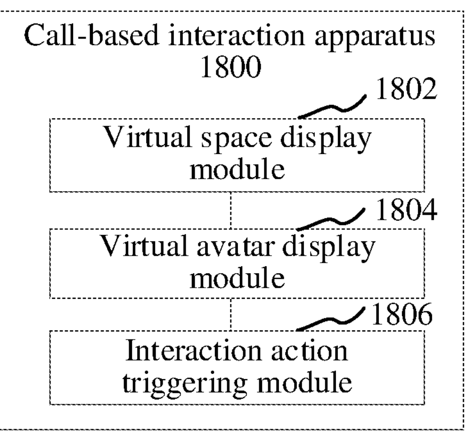
FIG. 18 is a block diagram of a structure of a call interaction apparatus according to an embodiment.

In one embodiment, as shown in FIG. 18, a call interaction apparatus 1800 is provided and includes: a virtual space display module 1802, a virtual avatar display module 1804, and an interactive action triggering module 1806.

The virtual space display module 1802 is configured to display virtual space and maintain a call between at least two call parties in response to a virtual space entry event in a case that the at least two call parties are having the call.

The virtual avatar display module 1804 is configured to display a virtual avatar corresponding to at least one of the call parties in the virtual space. The displayed virtual avatar including a virtual avatar of the call party that enters the virtual space based on the virtual space entry event.

The interactive action triggering module 1806 is configured to trigger, in response to an interaction triggering event for the at least one virtual avatar, a virtual avatar indicated by the interaction triggering event among the at least one virtual avatar to perform an interactive action in the virtual space.

In one embodiment, the virtual space display module 1802 is further configured to display the virtual space and maintain the call between the at least two call parties in response to the virtual space entry event triggered by a first call party among the at least two call parties in a case that the at least two call parties are having the call. The virtual avatar display module 1804 is further configured to display the virtual avatar corresponding to the first call party in the virtual space.

In one embodiment, the virtual space display module 1802 is further configured to display a call interface corresponding to the first call party among the at least two call parties in a case that the at least two call parties are having the call, the call interface including a virtual space entrance control; and display the virtual space and maintain the call between the at least two call parties in response to a triggering event triggered by the first call party for the virtual space entrance control.

In one embodiment, the virtual space display module 1802 is further configured to display the virtual space of the first call party in response to the triggering event triggered by the first call party for the virtual space entrance control. The virtual avatar display module 1804 is further configured to display the virtual avatar corresponding to the first call party and a virtual avatar corresponding to a second call party in virtual space of the first call party.

In one embodiment, the virtual space display module 1802 is further configured to display, in a case that there is another call party that has entered the virtual space among the at least two call parties, virtual avatars respectively corresponding to the first call party and the another call party in the virtual space.

In one embodiment, the virtual space display module 1802 is further configured to display, in a case that the at least two call parties are having the call and a virtual space invitation from a second call party among the at least two call parties is received, an invitation operation area for the virtual space invitation; and display the virtual space and maintain the call between the at least two call parties in response to an invitation acceptance operation triggered by the first call party among the at least two call parties in the invitation operation area.

In one embodiment, the virtual space display module 1802 is further configured to display, in a case that the at least two call parties are having the call and the virtual space invitation from the second call party that is already in the virtual space is received, the invitation operation area for the virtual space invitation, the invitation operation area displaying an acceptance control; and display, in response to a triggering operation by the first call party for the acceptance control, the virtual space in which the second call party is already located.

In one embodiment, the call-based interaction apparatus 1800 is further configured to cancel display of the invitation operation area and maintain the call between the at least two call parties in response to an invitation rejection operation triggered by the first call party in the invitation operation area.

In one embodiment, the call-based interaction apparatus 1800 is further configured to switch, in response to a virtual space switching event triggered by the first call party, the displayed virtual space to virtual space indicated by the virtual space switching event.

In one embodiment, the call-based interaction apparatus 1800 is further configured to, in a case that virtual space of a first call party is displayed and a call invitation from a second call party that is already in virtual space is received, continue to display the virtual space of the first call party, and establish and maintain a call between the second call party and the first call party in response to an answer operation for the call invitation; and display a virtual avatar corresponding to the first call party in the virtual space of the first call party.

In one embodiment, the virtual avatar display module 1804 is further configured to display at least one contact option of a first call party in response to a contact query operation triggered by the first call party among the at least two call parties; display virtual space of a target contact in response to a selection event made by the first call party for a target contact option in the at least one contact option in a case that the target contact represented by the target contact option is in the virtual space of the target contact; and display a virtual avatar corresponding to the target contact in the virtual space after switching.

In one embodiment, the virtual avatar display module 1804 is further configured to display at least one contact option of a first call party in response to a contact query operation triggered by the first call party among the at least two call parties; and add, in response to a selection event made by the first call party for a target contact option in the at least one contact option, a virtual avatar corresponding to a target contact to the currently displayed virtual space in a case that the target contact represented by the target contact option is not in any virtual space.

In one embodiment, the virtual avatar display module 1804 is further configured to add, in response to a selection event made by the first call party for a target contact option, the target contact represented by the target contact option to one of the call and a new call. Call parties of the new call include the first call party and the target contact.

In one embodiment, the call-based interaction apparatus 1800 is further configured to display an arrangement interface for the virtual space; display an arrangement option in response to a triggering operation for the arrangement interface; and display updated virtual space in response to a selection event for a target arrangement option among the arrangement option, an arrangement of the updated virtual space matching the target arrangement option.

In one embodiment, the call-based interaction apparatus 1800 is further configured to display an input area, and display, in response to an input event triggered in the input area, information indicated by the input event in an information display area in the virtual space.

In one embodiment, the call-based interaction apparatus 1800 is further configured to maintain the call between the at least two call parties. The at least two call parties include the first call party and the second call party. In a case that the first call party and the second call party are both in the virtual space, a sound received by the first call party and belonging to the second call party in the call is associated with a positional relationship between the first call party and the second call party relative to the virtual space.

In one embodiment, a larger spatial distance between a first virtual position and a second virtual position indicates a lower sound received by the first call party and belonging to the second call party. The first virtual position is a position of the first call party in the virtual space. The second virtual position is a position of the second call party in the virtual space.

In one embodiment, the interactive action triggering module 1806 is further configured to display, in response to an action indicating operation for the at least one virtual avatar, that the at least one virtual avatar performs an action indicated by the action indicating operation in the virtual space.

In one embodiment, the at least two call parties include the first call party and the second call party. A first virtual avatar corresponding to the first call party and a second virtual avatar corresponding to the second call party are displayed in the virtual space. The interactive action triggering module 1806 is further configured to display a virtual interaction area in the virtual space; and trigger virtual interaction between the first virtual avatar and the second virtual avatar in the virtual interaction area.

In one embodiment, the at least two call parties include a first call party and a plurality of second call parties. The call-based interaction apparatus 1800 is further configured to determine a target call party that enters the virtual space among the plurality of second call parties and determine a non-target call party that does not enter the virtual space among the plurality of second call parties in a case that the first call party enters the virtual space; create a dedicated audio channel corresponding to each target call party; and receive a sound of the corresponding target call party via the dedicated audio channel and receive a sound of each non-target call party via a preset public audio channel.

In one embodiment, the call-based interaction apparatus 1800 is further configured to determine a real identity identifier of the target call party in real space and determine a virtual identity identifier of the target call party in the virtual space; and bind the real identity identifier to the virtual identity identifier to obtain binding information and generate the dedicated audio channel for the target call party based on the binding information.

Each module of the above call-based interaction apparatus may be implemented entirely or partially through software, hardware, or a combination thereof. Each of the above modules may be embedded in or independent of a processor of a computer device in a form of hardware, or may be stored in a memory of the computer device in a form of software, so that the processor can call and execute operations corresponding to the above modules.

Figure 19:
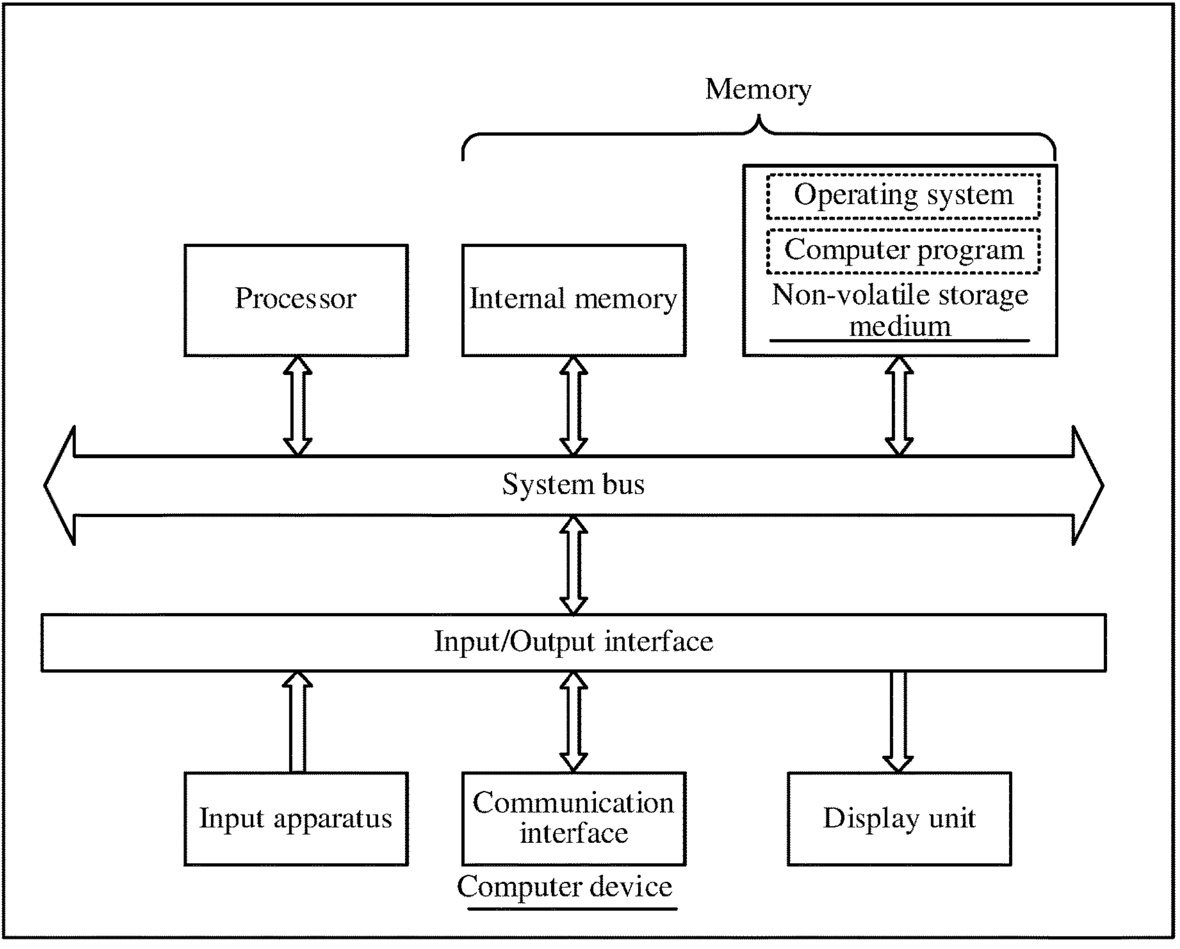
FIG. 19 is a diagram of an internal structure of a computer device according to an embodiment.

In one embodiment, a computer device is provided. The computer device may be a terminal, and a diagram of an internal structure of the computer device may be as shown in FIG. 19. The computer device includes a processor, a memory, an input/output interface, a communication interface, a display unit, and an input device. The processor, the memory, and the input/output interface are connected via a system bus, and the communication interface, the display unit, and the input device are connected to the system bus via the input/output interface. The processor of the computer device is configured to provide computation and control abilities. The memory of the computer device includes a non-volatile storage medium and an internal memory. The non-volatile storage medium has an operating system and a computer program stored thereon. The internal memory provides an environment for running of the operating system and the computer program in the non-volatile storage medium. The input/output interface of the computer device is used for exchanging information between the processor and an external device. The communication interface of the computer device is used for communication with an external terminal in a wired or wireless manner. The wireless manner may be implemented by using WIFI, a mobile cellular network, NFC (Near Field Communication), or another technology. The computer program, when executed by the processor, implements a call-based interaction method. The display unit of the computer device is configured to form a visible picture, and may be a display, a projection apparatus, or a virtual reality imaging device. The display may be a liquid crystal display or an e-ink display. The input apparatus of the computer device may be a touch layer covering the display, or may be a button, a trackball, or a touchpad disposed on a housing of the computer device, or may be an external keyboard, touchpad, a mouse, or the like.

A person of ordinary skill in the art may understand that, the structure shown in FIG. 19 is a block diagram of a partial structure related to a solution in this application, and does not constitute a limitation to the computer device to which the solution in this application is applied. Specifically, the computer device may include more components or fewer components than those shown in the drawing, or some components may be combined, or a different component deployment may be used.

In one embodiment, a computer device is further provided, including a memory and a processor. The memory has a computer program stored therein. The processor, when executing the computer program, implements the steps in the above method embodiments.

In one embodiment, a computer-readable storage medium is provided, having a computer program stored thereon. The computer program, when executed by a processor, implements the steps in the above method embodiments.

In one embodiment, a computer program product or computer program is provided, including computer instructions that are stored in a computer-readable storage medium. A processor of a computer device reads the computer instructions from the computer-readable storage medium, and the processor executes the computer instructions, so that the computer device performs the steps in the above method embodiments.

User information (including but not limited to user equipment information, user personal information, and the like) and data (including but not limited to data used for analysis, stored data, displayed data, and the like) involved in this application are all information and data authorized by the user or fully authorized by all parties, and collection, use, and processing of relevant data need to comply with relevant laws, regulations, and standards of relevant countries and regions.

A person of ordinary skill in the art may understand that all or some of procedures of the method in the foregoing embodiments may be implemented by a computer program instructing relevant hardware. The computer program may be stored in a non-volatile computer-readable storage medium. When the computer program is executed, the procedures of the foregoing method embodiments may be included. References to the memory, the database, or other medium used in the embodiments provided in this application may all include at least one of a non-volatile and a volatile memory. The non-volatile memory may include a read-only memory (ROM), magnetic tape, a floppy disk, a flash memory, an optical memory, a high-density embedded non-volatile memory, a resistive random access memory (ReRAM), a magnetoresistive random access memory (MRAM), a ferroelectric random access memory (FRAM), a phase change memory (PCM), a graphene memory, and the like. The volatile memory may include a random access memory (RAM) or an external cache. As an illustration and not a limitation, the RAM may be in various forms, such as a static random access memory (SRAM) or a dynamic random access memory (DRAM). The databases involved in various embodiments provided in this application may include at least one of a relational database and a non-relational database. The non-relational database may include a blockchain-based distributed database, and the like, but is not limited thereto. The processor involved in embodiments provided in this application may be a general-purpose processor, a central processing unit, a graphics processor, a digital signal processor, a programmable logic device, a quantum computing-based data processing logic device, and the like, and is not limited thereto.

Technical features of the foregoing embodiments may be randomly combined. To make description concise, not all possible combinations of the technical features in the foregoing embodiments are described. However, the combinations of these technical features shall be considered as falling within the scope recorded by this specification provided that no conflict exists.

The foregoing embodiments only show several implementations of this application and are described in detail, but cannot be construed as a limit to the patent scope of this application. For a person of ordinary skill in the art, several transformations and improvements can be made without departing from the idea of this application. These transformations and improvements belong to the scope of protection of this application. Therefore, the scope of protection of this application shall be subject to the appended claims.

What is claimed is:

1. A call interaction method, performed by a terminal, the method comprising:

displaying a call interface that facilitates an ongoing call between at least two call parties that have established a communication connection, the call interface being presented on the terminal of a first call party of the at least two call parties, and the call interface being configured for a basic audio call and comprising: an identifier of a second call party of the at least two call parties and a virtual space entrance control;

during the ongoing call between the at least two parties, detecting a virtual space entry event triggered by a selection on the virtual space entrance control on the call interface or by an invitation acceptance operation that accepts a virtual space invitation from the second call party;

displaying, while maintaining the ongoing call between the at least two call parties, a virtual space after detecting the virtual space entry event;

displaying one or more virtual avatars corresponding to at least one of the call parties in the virtual space, the displayed one or more virtual avatars comprising a virtual avatar of the call party that enters the virtual space based on the virtual space entry event; and triggering a virtual avatar among the one or more virtual avatars to perform an interactive action in the virtual space in response to an interaction triggering event for the virtual avatar.

2. The method according to claim 1, wherein the displaying the one or more virtual avatars corresponding to the at least one of the call parties in the virtual space comprises:

displaying a virtual avatar corresponding to the first call party in the virtual space.

3. The method according to claim 1, wherein the displaying the virtual space comprises:

displaying the virtual space of the first call party in response to the triggering event triggered by the first call party for the virtual space entrance control; and displaying the one or more virtual avatars comprises:

displaying a virtual avatar corresponding to the first call party and a virtual avatar corresponding to the second call party in the virtual space of the first call party.

4. The method according to claim 1, wherein the displaying the one or more virtual avatars comprises:

displaying, in a case that there is another call party that has entered the virtual space other than the at least two call parties, virtual avatars respectively corresponding to the first call party and the another call party in the virtual space.

5. The method according to claim 1, further comprising:

displaying, during the ongoing call between the at least two parties and in response to receiving the virtual space invitation from the second call party, an invitation operation area for the virtual space invitation;

wherein the virtual space entry event is detected in response to the invitation acceptance operation triggered by the first call party in the invitation operation area.

6. The method according to claim 5, wherein:

the second call party is already in the virtual space when the virtual space invitation for the first call party is received, the invitation operation area comprises an acceptance control; and the displaying the virtual space comprises:

displaying, in response to a triggering operation by the first call party for the acceptance control, the virtual space in which the second call party is already located.

7. The method according to claim 5, wherein the method further comprises:

canceling display of the invitation operation area and maintaining the call between the at least two call parties in response to an invitation rejection operation triggered by the first call party in the invitation operation area.

8. The method according to claim 5, wherein the displayed virtual space belongs to the second call party among the at least two call parties; and the method further comprises:

switching, in response to a virtual space switching event triggered by the first call party, the displayed virtual space to virtual space indicated by the virtual space switching event.

9. The method according to claim 1, further comprising:

in a case that virtual space of the first call party is displayed and a call invitation from the second call party that is already in virtual space is received, continuing to display the virtual space of the first call party, and establishing and maintaining a call between the second call party and the first call party in response to an answer operation for the call invitation; and the displaying the one or more virtual avatars in the virtual space comprises:

displaying a virtual avatar corresponding to the first call party in the virtual space of the first call party.

10. The method according to claim 1, wherein the method further comprises:

displaying at least one contact option of the first call party in response to a contact query operation triggered by the first call party among the at least two call parties;

displaying virtual space of a target contact in response to a selection event made by the first call party for a target contact option in the at least one contact option in a case that the target contact represented by the target contact option is in the virtual space of the target contact; and displaying a virtual avatar corresponding to the target contact in the virtual space after switching.

11. The method according to claim 1, wherein the method further comprises:

displaying at least one contact option of the first call party in response to a contact query operation triggered by the first call party among the at least two call parties; and adding, in response to a selection event made by the first call party for a target contact option in the at least one contact option, a virtual avatar corresponding to a target contact to the currently displayed virtual space in a case that the target contact represented by the target contact option is not in any virtual space.

12. The method according to claim 11, wherein the method further comprises:

adding, in response to the selection event made by the first call party for the target contact option, the target contact represented by the target contact option to one of the calls and a new call, call parties of the new call comprising the first call party and the target contact.

13. The method according to claim 1, wherein the method further comprises:

displaying an arrangement interface for the virtual space;

displaying an arrangement option in response to a triggering operation for the arrangement interface; and displaying updated virtual space in response to a selection event for a target arrangement option, an arrangement of the updated virtual space matching the target arrangement option.

14. The method according to claim 1, wherein the method further comprises:

displaying an input area, and displaying, in response to an input event triggered in the input area, information indicated by the input event in an information display area in the virtual space.

15. The method according to claim 1, wherein in a case that the first call party and the second call party are both in the virtual space, a sound from the second call party received by the first call party and in the call is associated with a positional relationship between the first call party and the second call party in the virtual space.

16. The method according to claim 15, wherein a larger spatial distance between a first virtual position and a second virtual position indicates a lower sound from the second call party received by the first call party; the first virtual position is a position of the first call party in the virtual space; and the second virtual position is a position of the second call party in the virtual space.

17. The method according to claim 1, wherein the triggering a virtual avatar indicated by the interaction triggering event to perform an interactive action in the virtual space in response to an interaction triggering event for the at least one virtual avatar, comprises:

displaying, in response to an action indicating operation for the virtual avatar, that the virtual avatar performs an action indicated by the action indicating operation in the virtual space.

18. A computer device, comprising a memory and a processor, the memory having a computer program stored therein, and the processor, when executing the computer program, implementing:

displaying a call interface that facilitates an ongoing call between at least two call parties that have established a communication connection, the call interface being presented on the terminal of a first call party of the at least two call parties, and the call interface being configured for a basic audio call and comprising: an identifier of a second call party of the at least two call parties and a virtual space entrance control;

during the ongoing call between the at least two parties, detecting a virtual space entry event triggered by a selection on the virtual space entrance control on the call interface or by an invitation acceptance operation that accepts a virtual space invitation from the second call party:

displaying, while maintaining the ongoing call between the at least two call parties, a virtual space after detecting the virtual space entry event;

displaying one or more virtual avatars corresponding to at least one of the call parties in the virtual space, the displayed one or more virtual avatars comprising a virtual avatar of the call party that enters the virtual space based on the virtual space entry event; and triggering a virtual avatar among the one or more virtual avatars to perform an interactive action in the virtual space in response to an interaction triggering event for the virtual avatar.

19. A non-transitory computer-readable storage medium, having a computer program stored thereon, the computer program, when executed by a processor, causing the processor to implement:

displaying a call interface that facilitates an ongoing call between at least two call parties that have established a communication connection, the call interface being presented on the terminal of a first call party of the at least two call parties, and the call interface being configured for a basic audio call and comprising: an identifier of a second call party of the at least two call parties and a virtual space entrance control;

during the ongoing call between the at least two parties, detecting a virtual space entry event triggered by a selection on the virtual space entrance control on the call interface or by an invitation acceptance operation that accepts a virtual space invitation from the second call party;

displaying, while maintaining the ongoing call between the at least two call parties, a virtual space after detecting the virtual space entry event;

displaying one or more virtual avatars corresponding to at least one of the call parties in the virtual space, the displayed one or more virtual avatars comprising a virtual avatar of the call party that enters the virtual space based on the virtual space entry event; and triggering a virtual avatar among the one or more virtual avatars to perform an interactive action in the virtual space in response to an interaction triggering event for the virtual avatar.

* * * * *